(12) United States Patent
Ko et al.

(10) Patent No.: US 12,538,254 B2
(45) Date of Patent: Jan. 27, 2026

(54) NETWORK CONFIGURATION-BASED SIDELINK POSITIONING METHOD AND APPARATUS

(71) Applicant: LG ELECTRONICS INC., Seoul (KR)

(72) Inventors: Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 432 days.

(21) Appl. No.: 18/023,333

(22) PCT Filed: Aug. 26, 2021

(86) PCT No.: PCT/KR2021/011450
§ 371 (c)(1),
(2) Date: Sep. 11, 2023

(87) PCT Pub. No.: WO2022/045798
PCT Pub. Date: Mar. 3, 2022

(65) Prior Publication Data
US 2024/0214966 A1  Jun. 27, 2024

Related U.S. Application Data

(60) Provisional application No. 63/070,806, filed on Aug. 26, 2020.

(51) Int. Cl.
*H04W 64/00* (2009.01)
*H04L 5/00* (2006.01)
*H04W 92/18* (2009.01)

(52) U.S. Cl.
CPC ........... *H04W 64/00* (2013.01); *H04L 5/0048* (2013.01); *H04W 92/18* (2013.01)

(58) Field of Classification Search
CPC ........ G01S 5/0072; G01S 5/0236; G01S 5/14; G01S 5/0289; G01S 5/0027;
(Continued)

(56) References Cited

U.S. PATENT DOCUMENTS 11,425,676 B2 * 8/2022 Zhang ...................... G01S 5/14
2019/0230618 A1  7/2019 Saur et al.
(Continued)

FOREIGN PATENT DOCUMENTS

KR   1020200050901   5/2020
KR   1020200100005   8/2020

OTHER PUBLICATIONS

Huawei, HiSilicon, "Discussion of sidelink positioning," 3GPP TSG-RAN WG1 #101-e, R1-2004609, Jun. 2020, 7 pages.
(Continued)

*Primary Examiner* — Lester G Kincaid
(74) *Attorney, Agent, or Firm* — LEE, HONG, DEGERMAN, KANG & WAIMEY

(57) ABSTRACT

A method for performing wireless communication by a first device, and an apparatus supporting same are provided. The method may comprise the steps of: transmitting, to a base station, information related to a sidelink (SL) positioning group; receiving, from the base station, information related to an SL positioning reference signal (PRS) resource; and transmitting or receiving an SL PRS on the basis of the SL PRS resource, wherein the SL PRS is a reference signal for positioning performed between multiple devices in the SL positioning group, and the SL PRS resource is configured on the basis of the information related to the SL positioning group.

19 Claims, 26 Drawing Sheets

(58) Field of Classification Search
CPC ... G01S 5/0036; H04W 64/00; H04W 64/003; H04W 4/40; H04W 4/023; H04W 4/027; H04W 4/08; H04W 76/14; H04W 24/10; H04W 72/51; H04W 16/28; H04L 5/0048; H04L 5/0051; H04L 5/0069; H04L 5/0094
See application file for complete search history.

(56) References Cited

U.S. PATENT DOCUMENTS

| | | |
|---|---|---|
| 2020/0128506 A1 | 4/2020 | Zhang et al. |
| 2021/0297216 A1* | 9/2021 | Shreevastav ............. G01S 1/20 |
| 2022/0132460 A1* | 4/2022 | Shimoda ............. H04W 64/003 |
| 2023/0133369 A1* | 5/2023 | Matsumura ........... H04L 5/0055 370/329 |
| 2023/0198710 A1* | 6/2023 | Dong ........................ G01S 5/02 370/329 |
| 2023/0296752 A1* | 9/2023 | Thomas ................ H04L 5/0048 342/125 |

OTHER PUBLICATIONS

LG Electronics, FirstNet, "New SID: Study on use cases, scenarios, and requirements of sidelink positioning," 3GPP TSG-RAN Meeting #88e, RP-200859, Jul. 2020, 6 pages.

Intel Corporation et al., "Motivation for SI: Study on NR Sidelink Positioning," 3GPP TSG-RAN Meeting #88e, RP-200898, Jun. 2020, 10 pages.

PCT International Application No. PCT/KR2021/011450, International Search Report dated Nov. 23, 2021, 4 pages.

Korean Intellectual Property Office Application No. 10-2023-7006960, Office Action dated May 30, 2025, 6 pages.

* cited by examiner

NETWORK CONFIGURATION-BASED SIDELINK POSITIONING METHOD AND APPARATUS

CROSS-REFERENCE TO RELATED APPLICATIONS

This application is the National Stage filing under 35 U.S.C. 371 of International Application No. PCT/KR2021/011450, filed on Aug. 26, 2021, the contents of which are all incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of a base station. SL communication is under consideration as a solution to the overhead of a base station caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, for a positioning operation using a SL channel, a SL positioning reference signal (PRS) may be transmitted and received between UEs. In this case, if SL PRS resources used by a first positioning group including a plurality of UEs and a second positioning group including a plurality of UEs are overlapped, SL positioning may not be performed due to collision of the SL PRS resources. Further, if a SL PRS resource is configured without considering the characteristics of a positioning group (e.g., the number of UEs belonging to the positioning group, the distance between UEs belonging to the positioning group, etc.), SL positioning may not be performed normally. For example, if the distance between the UEs in the positioning group is large, and the symbol length of the SL PRS resource is configured to be short, the SL PRS may not be successfully received by the UEs, which may lead to failure of SL positioning. Furthermore, if the SL PRS resource is configured without considering the characteristics of the positioning group (e.g., the number of UEs in the positioning group, the distance between UEs in the positioning group, etc.), the SL PRS resource may be unnecessarily wasted. For example, if the distance between the UEs in the positioning group is short, the symbol length of the SL PRS resource is configured to be long, the SL PRS resource may be wasted unnecessarily. Therefore, there is a need to propose a method for performing SL positioning and an apparatus for supporting the same, in order to solve the above-mentioned problems.

In an embodiment, provided is a method for performing wireless communication by a first device. The method may comprise: transmitting, to a base station, information related to a sidelink (SL) positioning group: receiving, from the base station, information related to a SL positioning reference signal (PRS) resource; and transmitting or receiving a SL PRS based on the SL PRS resource, wherein the SL PRS is a reference signal for positioning performed between a plurality of devices in the SL positioning group, and wherein the SL PRS resource is configured based on information related to the SL positioning group.

In an embodiment, provided is a first device adapted to perform wireless communication. The first device may comprise: one or more memories storing instructions: one or more transceivers: and one or more processors connected to the one or more memories and the one or more transceivers. For example, the one or more processors may execute the instructions to: transmit, to a base station, information related to a sidelink (SL) positioning group: receive, from the base station, information related to a SL positioning reference signal (PRS) resource; and transmit or receiving a SL PRS based on the SL PRS resource, wherein the SL PRS is a reference signal for positioning performed between a plurality of devices in the SL positioning group, and wherein the SL PRS resource is configured based on information related to the SL positioning group.

Resources for SL-based positioning can be configured efficiently.

DETAILED DESCRIPTION

Figure 1:
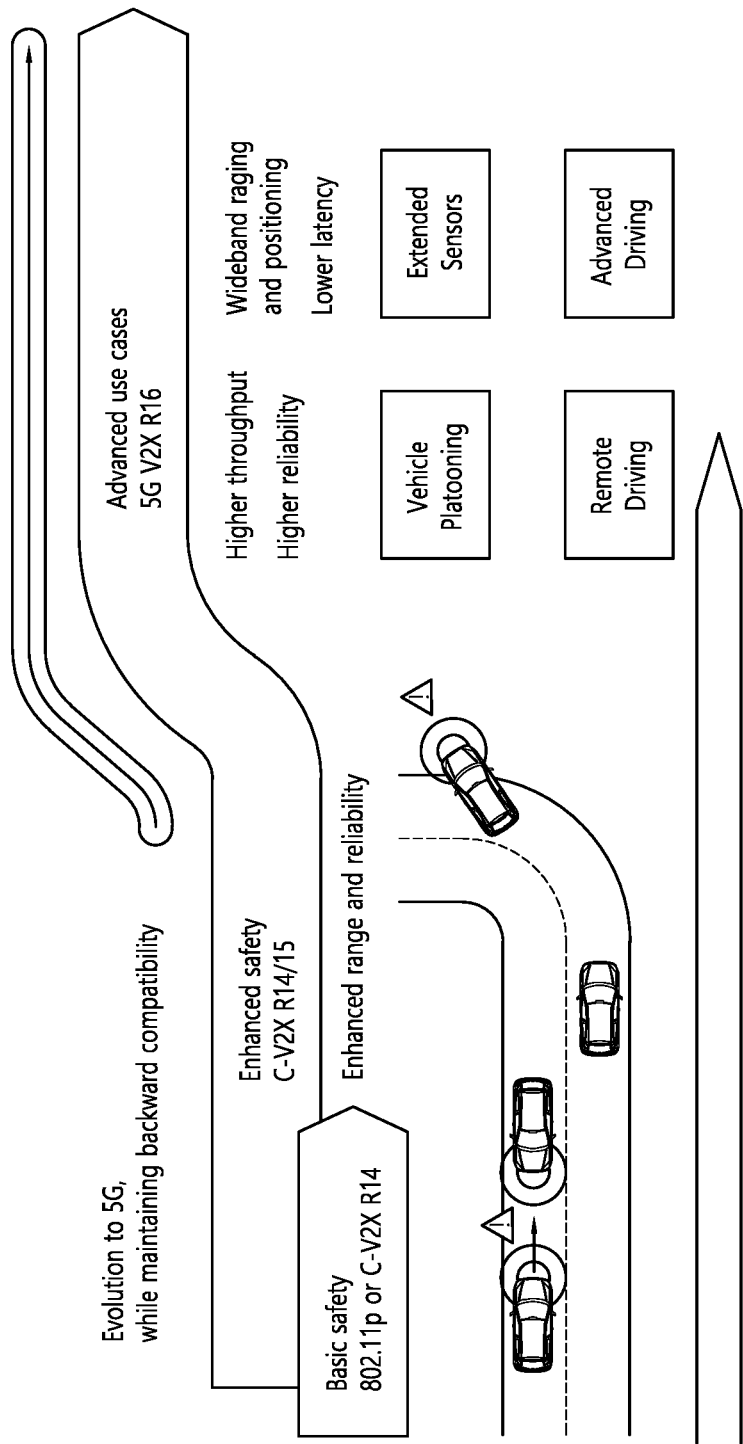
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
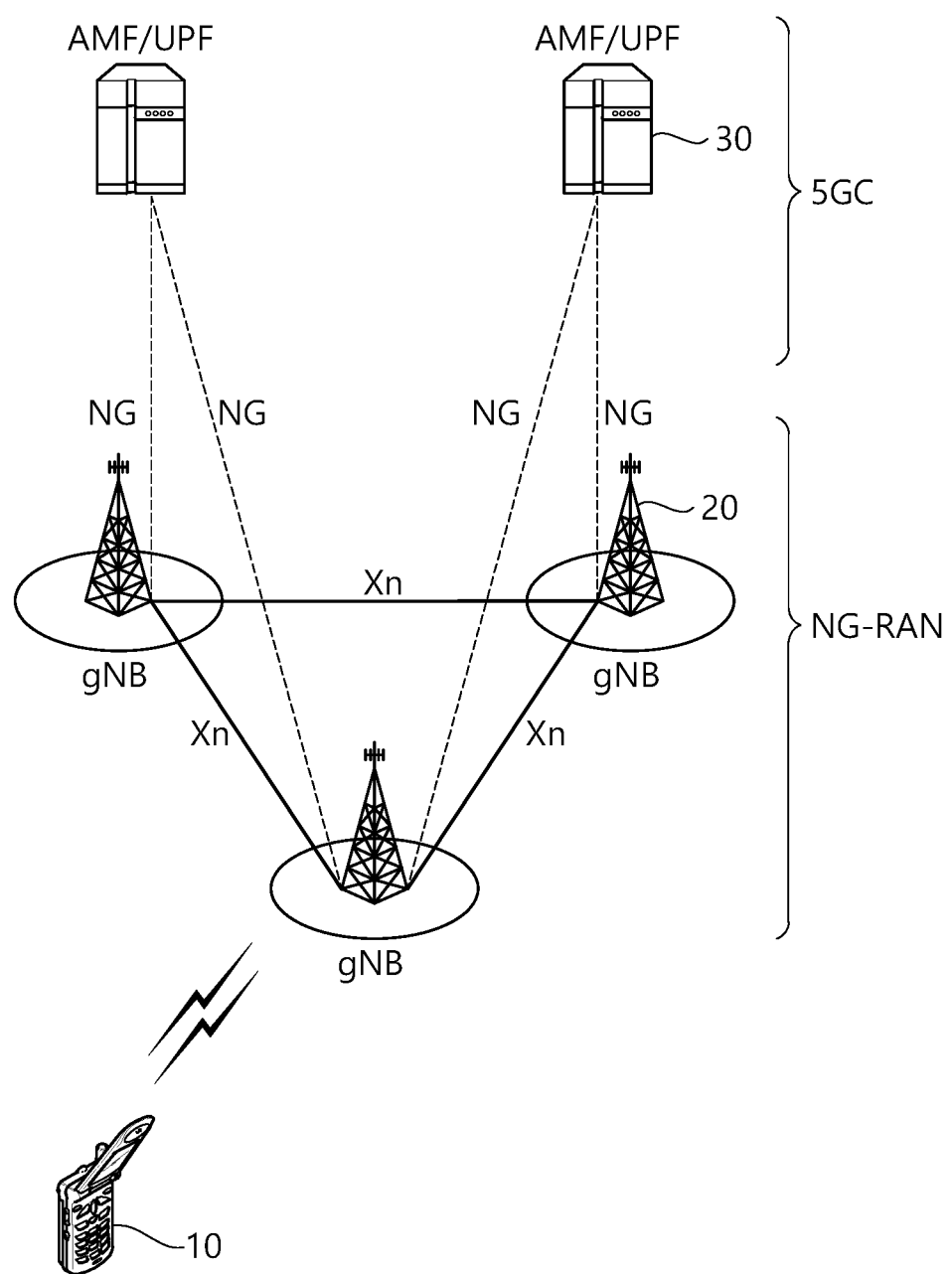
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
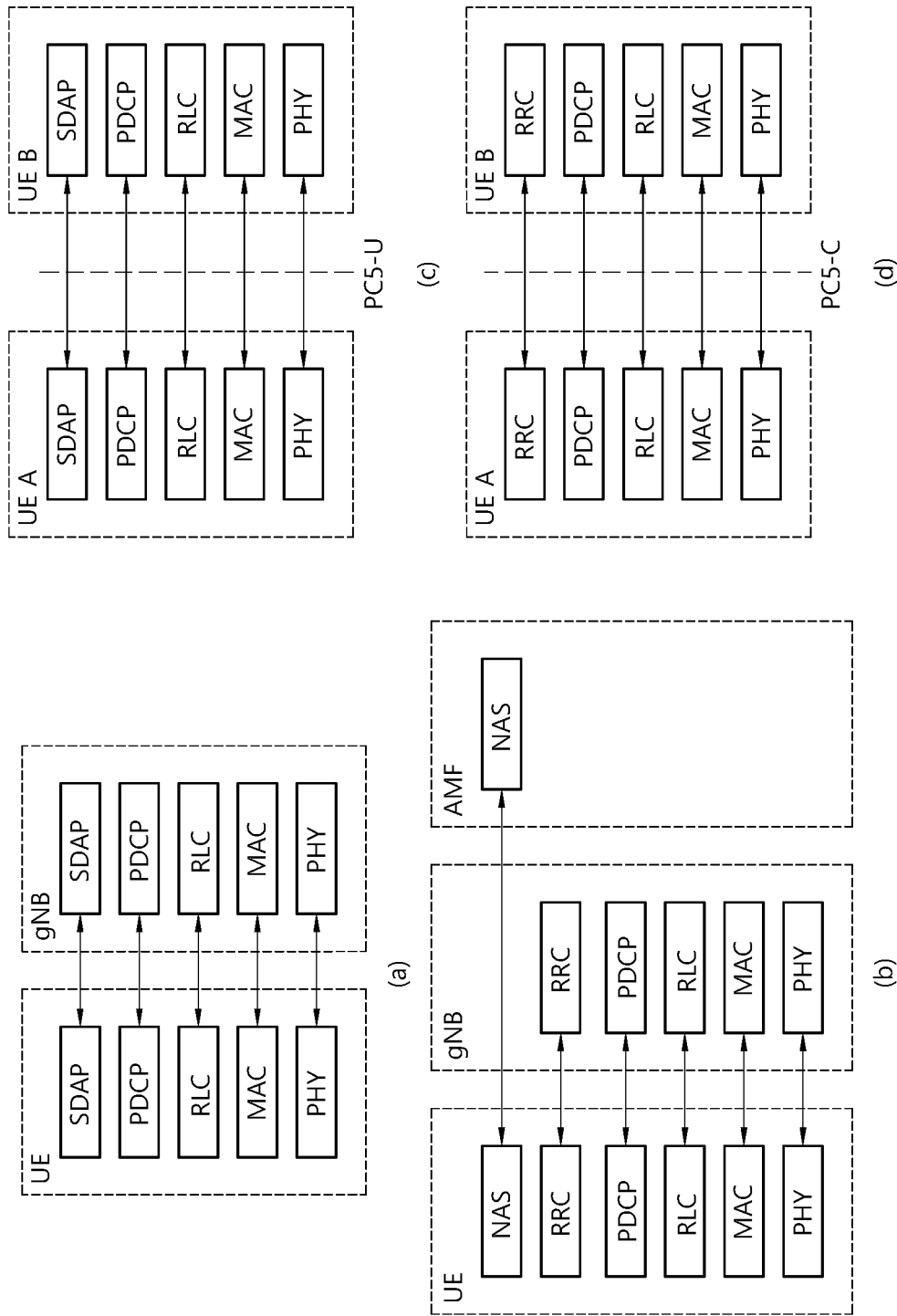
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QOS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QOS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
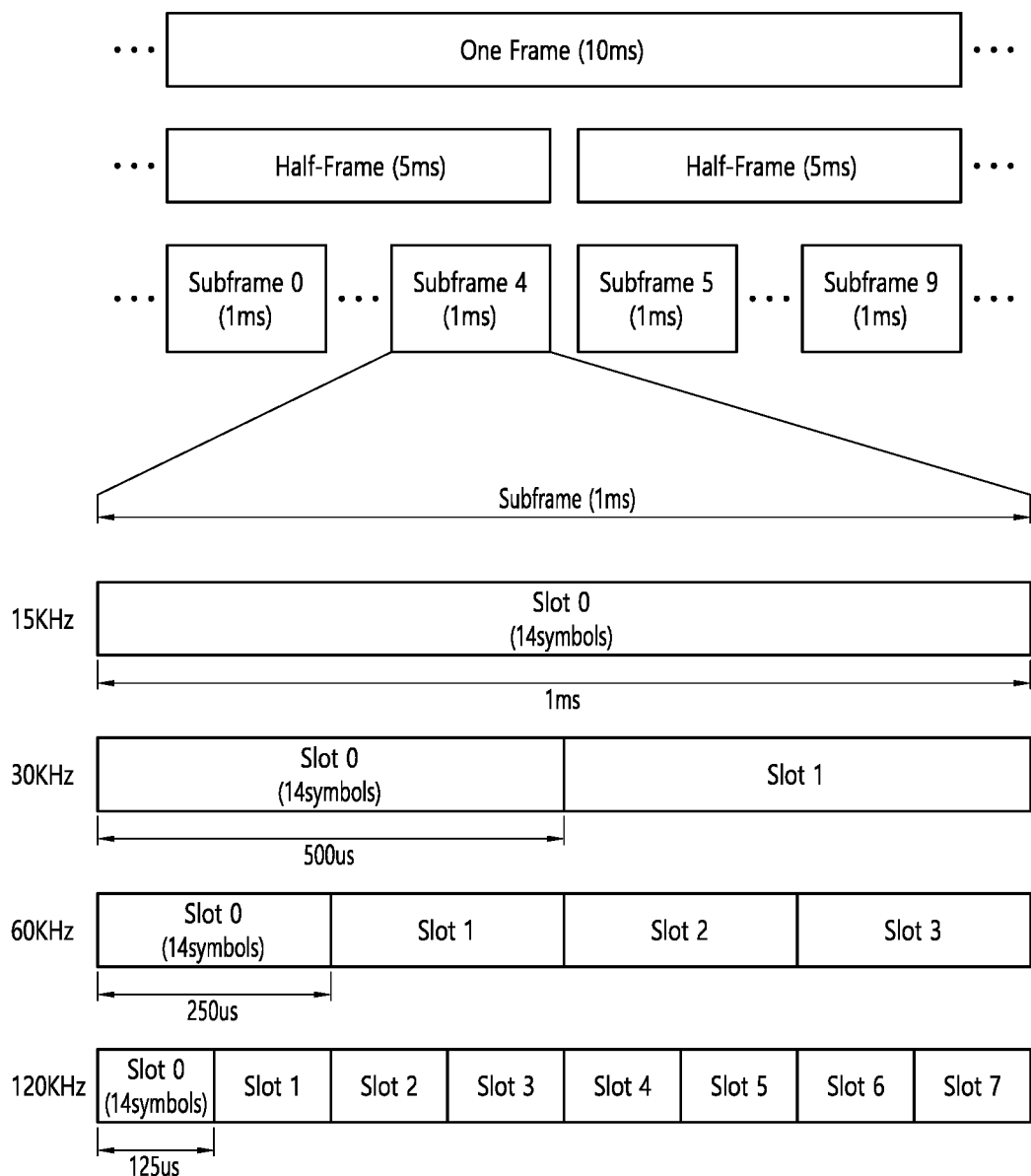
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 KHz/60 kHz a dense-urban, lower latency, wider carrier bandwidth may be supported. In case the SCS is 60 KHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
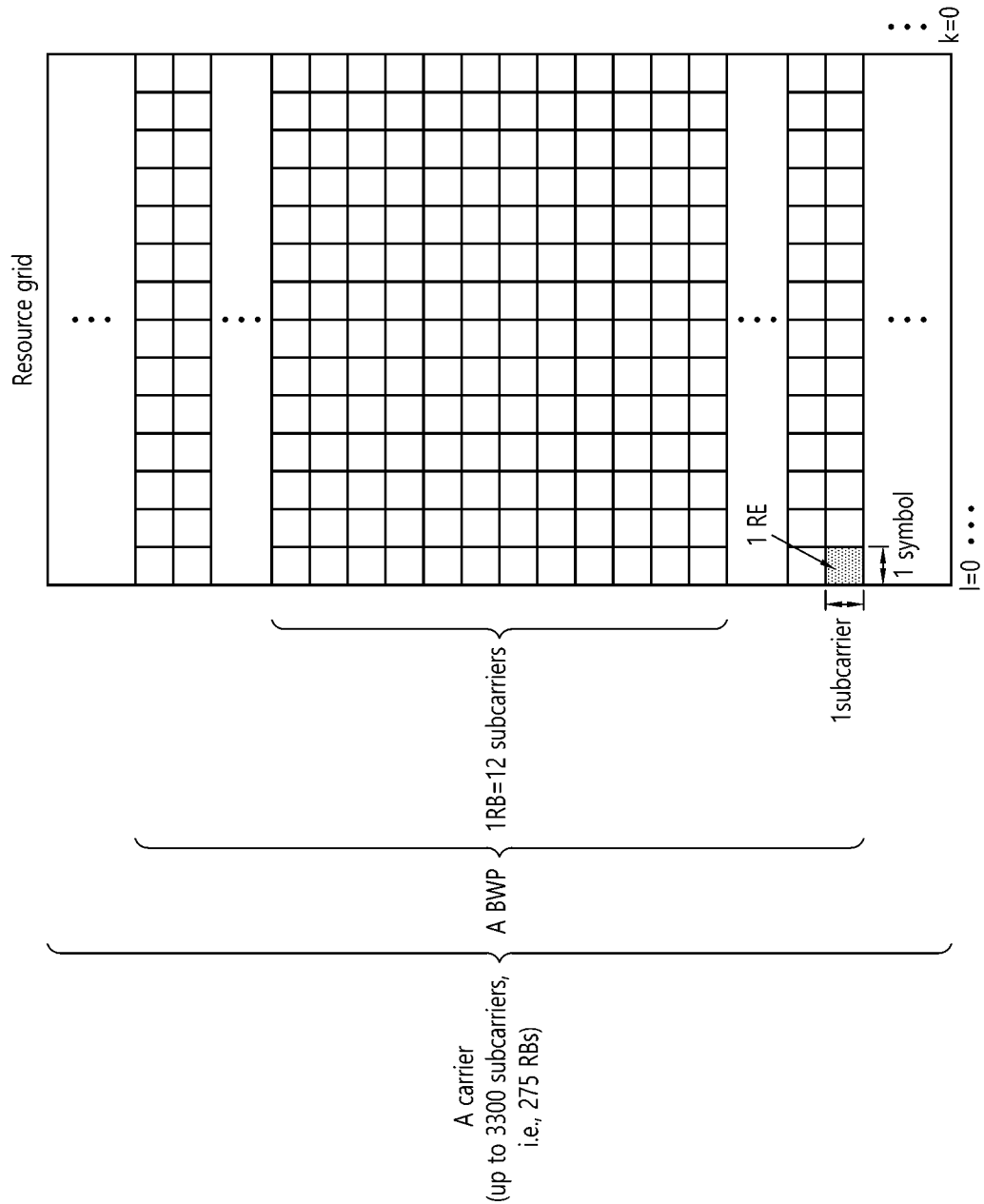
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
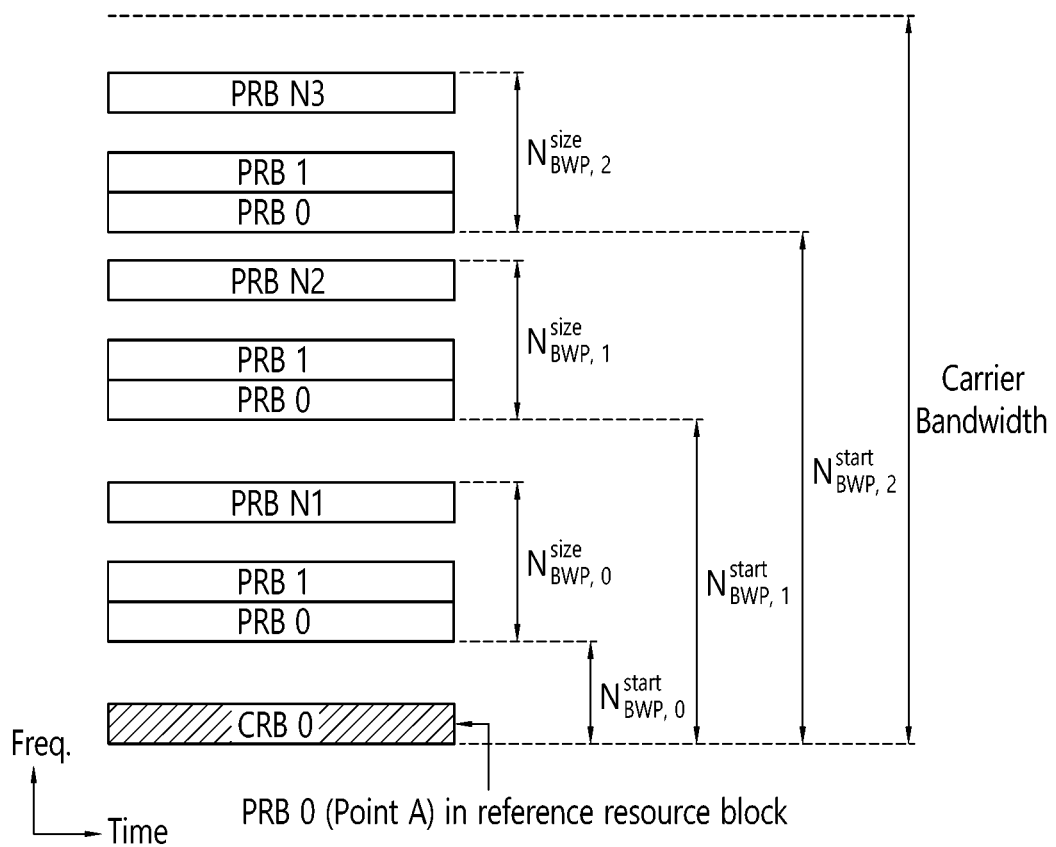
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
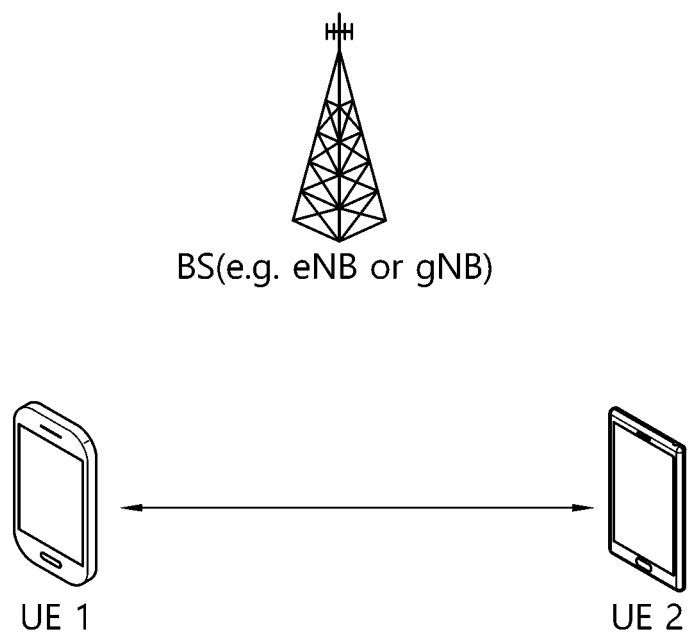
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
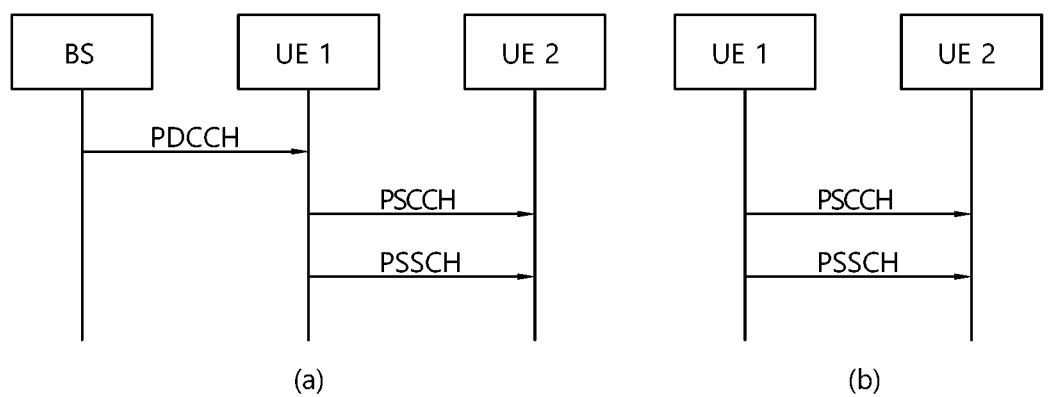
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
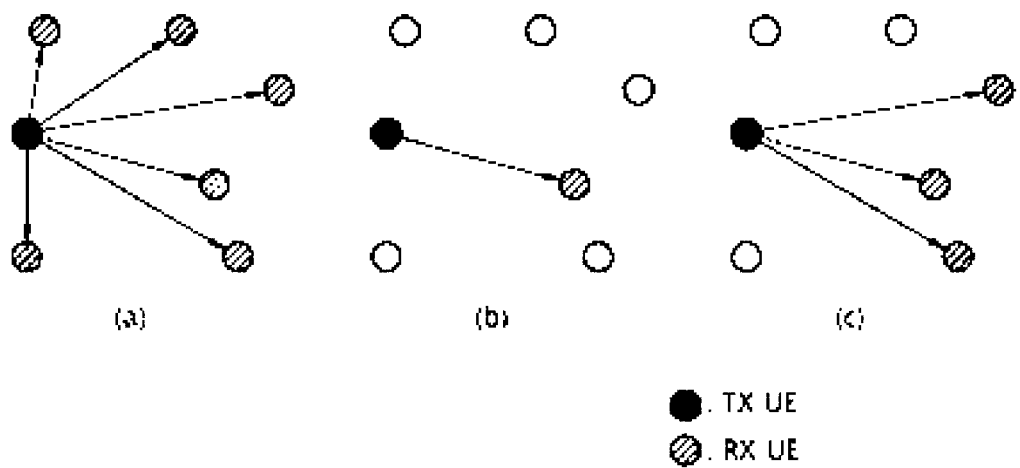
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
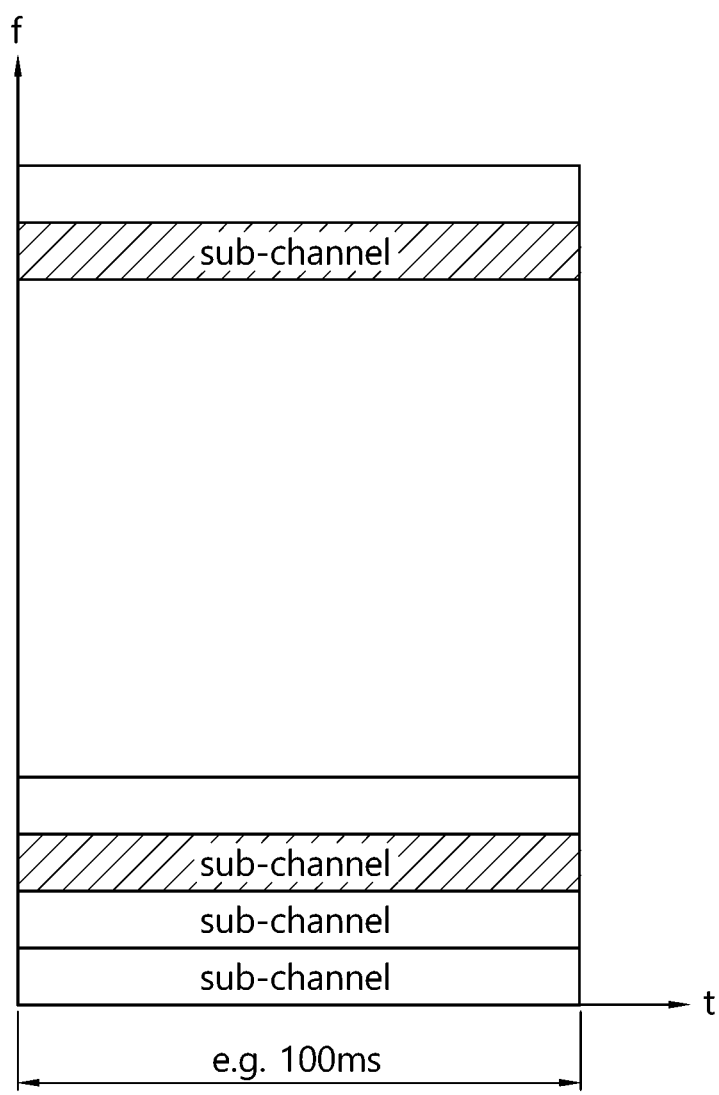
FIG. 10 shows a resource unit for CBR measurement, based on an embodiment of the present disclosure.

FIG. 10 shows a resource unit for CBR measurement, based on an embodiment of the present disclosure. The embodiment of FIG. 10 may be combined with various embodiments of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, positioning will be described.

Figure 11:
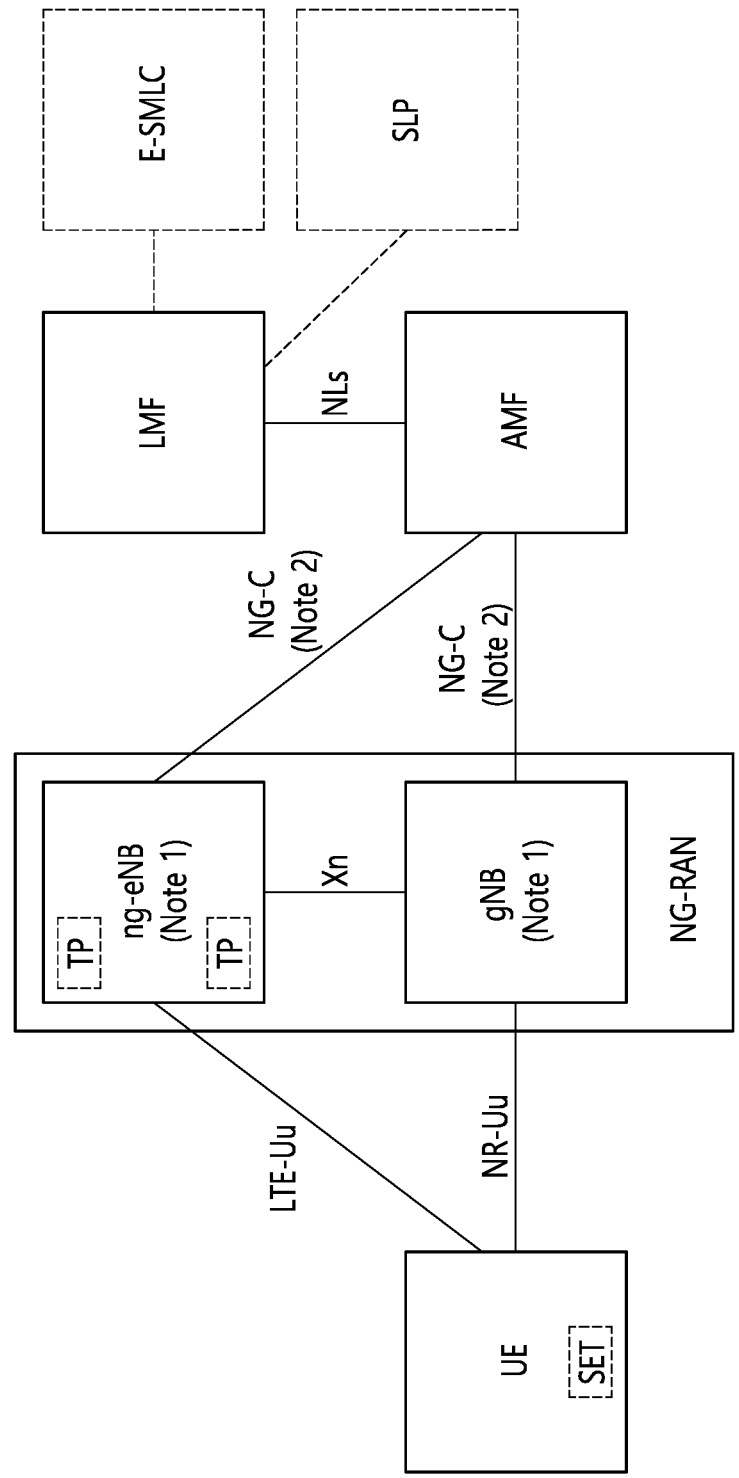
FIG. 11 shows an example of an architecture of a 5G system capable of positioning a UE having access to a next generation-radio access network (NG-RAN) or an E-UTRAN based on an embodiment of the present disclosure.

FIG. 11 shows an example of an architecture of a 5G system capable of positioning a UE having access to a next generation-radio access network (NG-RAN) or an E-UTRAN based on an embodiment of the present disclosure. The embodiment of FIG. 11 may be combined with various embodiments of the present disclosure.

Referring to FIG. 11, an AMF may receive a request for a location service related to a specific target UE from a different entity such as a gateway mobile location center (GMLC), or may determine to start the location service in the AMF itself instead of the specific target UE. Then, the AMF may transmit a location service request to a location management function (LMF). Upon receiving the location service request, the LMF may process the location service request and return a processing request including an estimated location or the like of the UE to the AMF. Meanwhile, if the location service request is received from the different entity such as GMLC other than the AMF, the AMF may transfer to the different entity the processing request received from the LMF.

A new generation evolved-NB (ng-eNB) and a gNB are network elements of NG-RAN capable of providing a measurement result for location estimation, and may measure a radio signal for a target UE and may transfer a resultant value to the LMF. In addition, the ng-eNB may control several transmission points (TPs) such as remote radio heads or PRS-dedicated TPs supporting a positioning reference signal (PRS)-based beacon system for E-UTRA.

The LMF may be connected to an enhanced serving mobile location centre (E-SMLC), and the E-SMLC may allow the LMF to access E-UTRAN. For example, the E-SMLC may allow the LMF to support observed time difference of arrival (OTDOA), which is one of positioning methods of E-UTRAN, by using downlink measurement obtained by a target UE through a signal transmitted from the gNB and/or the PRS-dedicated TPs in the E-UTRAN.

Meanwhile, the LMF may be connected to an SUPL location platform (SLP). The LMF may support and manage different location determining services for respective target UEs. The LMF may interact with a serving ng-eNB or serving gNB for the target UE to obtain location measurement of the UE. For positioning of the target UE, the LMF may determine a positioning method based on a location service (LCS) client type, a requested quality of service (QOS), UE positioning capabilities, gNB positioning capabilities, and ng-eNB positioning capabilities, or the like, and may apply such a positioning method to the serving gNB and/or the serving ng-eNB. In addition, the LMF may determine additional information such as a location estimation value for the target UE and accuracy of location estimation and speed. The SLP is a secure user plane location (SUPL) entity in charge of positioning through a user plane.

The UE may measure a downlink signal through NG-RAN, E-UTRAN, and/or other sources such as different global navigation satellite system (GNSS) and terrestrial beacon system (TBS), wireless local access network (WLAN) access points, Bluetooth beacons, UE barometric pressure sensors or the like. The UE may include an LCS application. The UE may communicate with a network to which the UE has access, or may access the LCS application through another application included in the UE. The LCS application may include a measurement and calculation function required to determine a location of the UE. For example, the UE may include an independent positioning function such as a global positioning system (GPS), and may report the location of the UE independent of NG-RAN transmission. Positioning information obtained independently as such may be utilized as assistance information of the positioning information obtained from the network.

Figure 12:
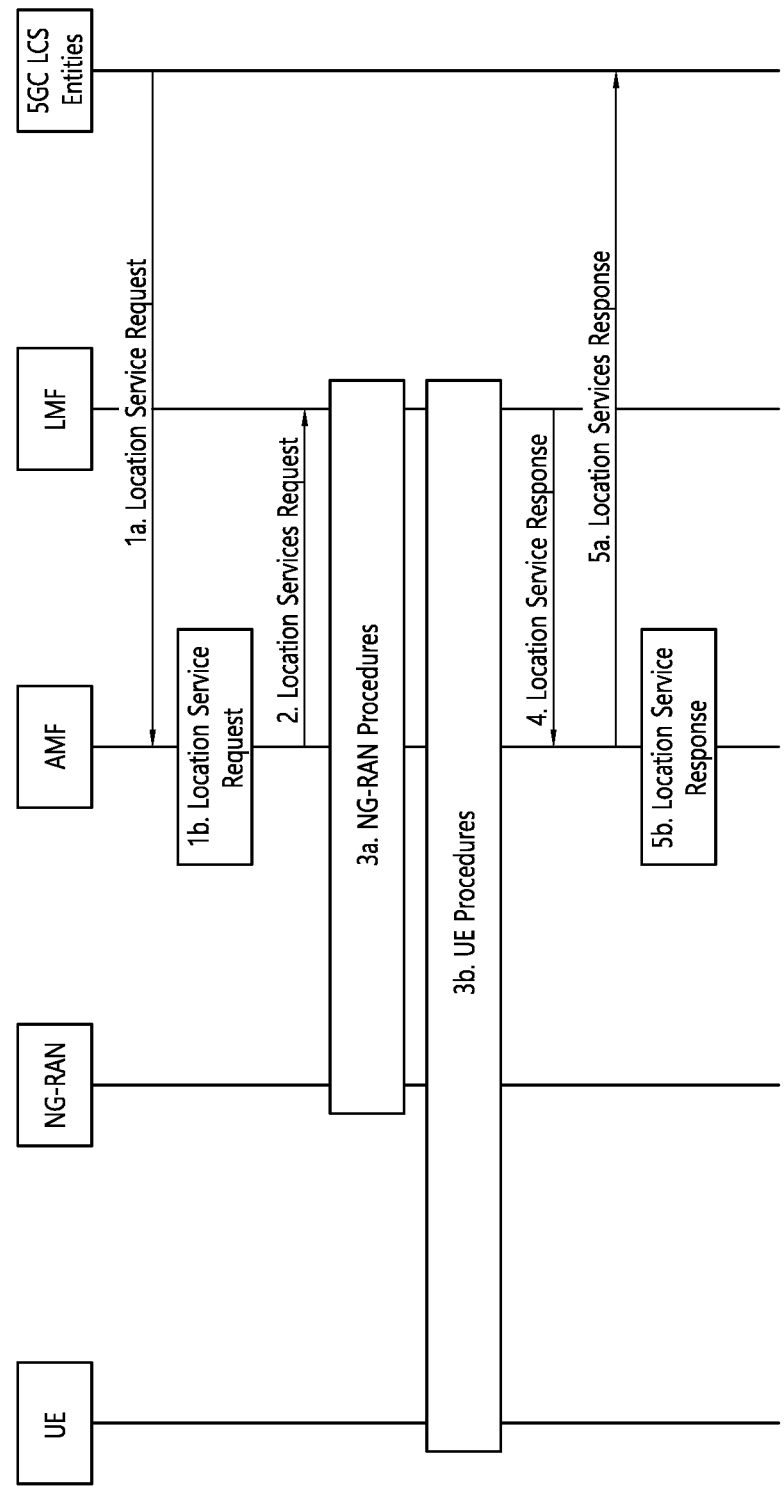
FIG. 12 shows an example of implementing a network for measuring a location of a UE based on an embodiment of the present disclosure.

FIG. 12 shows an example of implementing a network for measuring a location of a UE based on an embodiment of the present disclosure. The embodiment of FIG. 12 may be combined with various embodiments of the present disclosure.

When the UE is in a connection management (CM)-IDLE state, if an AMF receives a location service request, the AMF may establish a signaling connection with the UE, and may request for a network trigger service to allocate a specific serving gNB or ng-eNB. Such an operational process is omitted in FIG. 12. That is, it may be assumed in FIG. 12 that the UE is in a connected mode. However, due to signaling and data inactivation or the like, the signaling connection may be released by NG-RAN while a positioning process is performed.

A network operation process for measuring a location of a UE will be described in detail with reference to FIG. 12. In step a1, a 5GC entity such as GMLC may request a serving AMF to provide a location service for measuring a location of a target UE. However, even if the GMLC does not request for the location service, based on step 1b, the serving AMF may determine that the location service for measuring the location of the target UE is required. For example, to measure the location of the UE for an emergency call, the serving AMF may determine to directly perform the location service.

Thereafter, the AMF may transmit the location service request to an LMF based on step 2, and the LMF may start location procedures to obtain location measurement data or location measurement assistance data together with a serving ng-eNB and a serving gNB. Additionally, based on step 3b, the LMF may start location procedures for downlink positioning together with the UE. For example, the LMF may transmit assistance data defined in 3GPP TS 36.355, or may obtain a location estimation value or a location measurement value. Meanwhile, step 3b may be performed additionally after step 3a is performed, or may be performed instead of step 3a.

In step 4, the LMF may provide a location service response to the AMF. In addition, the location service response may include information on whether location estimation of the UE is successful and a location estimation value of the UE. Thereafter, if the procedure of FIG. 12 is initiated by step a1, the AMF may transfer the location service response to a 5GC entity such as GMLC, and if the procedure of FIG. 12 is initiated by step 1b, the AMF may use the location service response to provide a location service related to an emergency call or the like.

Figure 13:
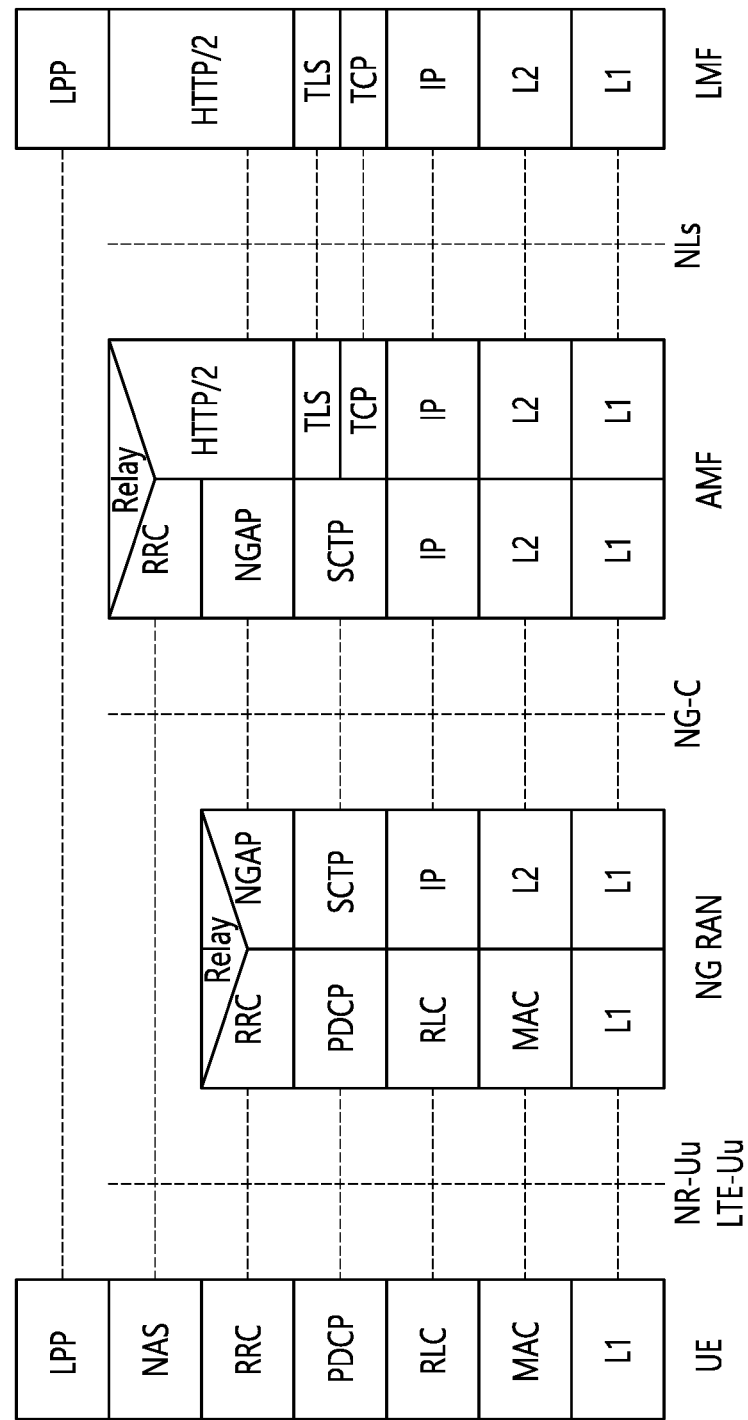
FIG. 13 shows an example of a protocol layer used to support LTE positioning protocol (LPP) message transmission between an LMF and a UE based on an embodiment of the present disclosure.

FIG. 13 shows an example of a protocol layer used to support LTE positioning protocol (LPP) message transmission between an LMF and a UE based on an embodiment of the present disclosure. The embodiment of FIG. 13 may be combined with various embodiments of the present disclosure.

An LPP PDU may be transmitted through a NAS PDU between an AMF and the UE. Referring to FIG. 13, an LPP may be terminated between a target device (e.g., a UE in a control plane or an SUPL enabled terminal (SET) in a user plane) and a location server (e.g., an LMF in the control plane and an SLP in the user plane). The LPP message may be transferred in a form of a transparent PDU through an intermediary network interface by using a proper protocol such as an NG application protocol (NGAP) through an NG-control plane (NG-C) interface and NAS/RRC or the like through an NR-Uu interface. The LPP protocol may enable positioning for NR and LTE by using various positioning methods.

For example, based on the LPP protocol, the target device and the location server may exchange mutual capability information, assistance data for positioning, and/or location information. In addition, an LPP message may be used to indicate exchange of error information and/or interruption of the LPP procedure.

Figure 14:
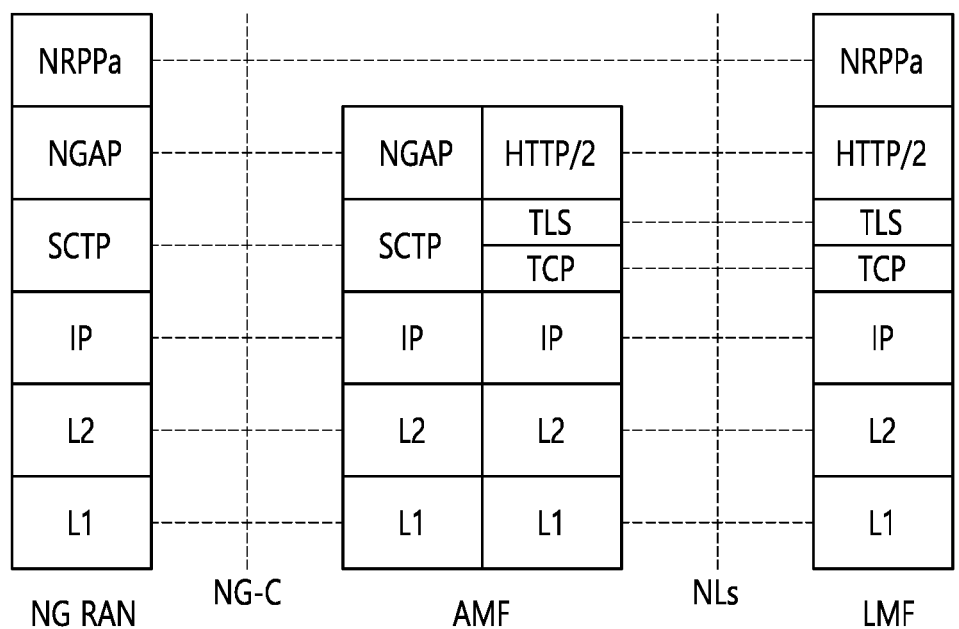
FIG. 14 shows an example of a protocol layer used to support NR positioning protocol A (NRPPa) PDU transmission between an LMF and an NG-RAN node based on an embodiment of the present disclosure.

FIG. 14 shows an example of a protocol layer used to support NR positioning protocol A (NRPPa) PDU transmission between an LMF and an NG-RAN node based on an embodiment of the present disclosure. The embodiment of FIG. 14 may be combined with various embodiments of the present disclosure.

The NRPPa may be used for information exchange between the NG-RAN node and the LMF. Specifically, the NRPPa may exchange an enhanced-cell ID (E-CID) for measurement, data for supporting an OTDOA positioning method, and a cell-ID, cell location ID, or the like for an NR cell ID positioning method, transmitted from the ng-eNB to the LMF. Even if there is no information on an associated NRPPa transaction, the AMF may route NRPPa PDUs based on a routing ID of an associated LMR through an NG-C interface.

A procedure of an NRPPa protocol for location and data collection may be classified into two types. A first type is a UE associated procedure for transferring information on a specific UE (e.g., location measurement information or the like), and a second type is a non UE associated procedure for transferring information (e.g., gNB/ng-eNB/TP timing information, etc.) applicable to an NG-RAN node and associated TPs. The two types of the procedure may be independently supported or may be simultaneously supported.

Meanwhile, examples of positioning methods supported in NG-RAN may include GNSS, OTDOA, enhanced cell ID (E-CID), barometric pressure sensor positioning, WLAN positioning, Bluetooth positioning and terrestrial beacon system (TBS), uplink time difference of arrival (UTDOA), etc.

(1) OTDOA (Observed Time Difference of Arrival)

Figure 15:
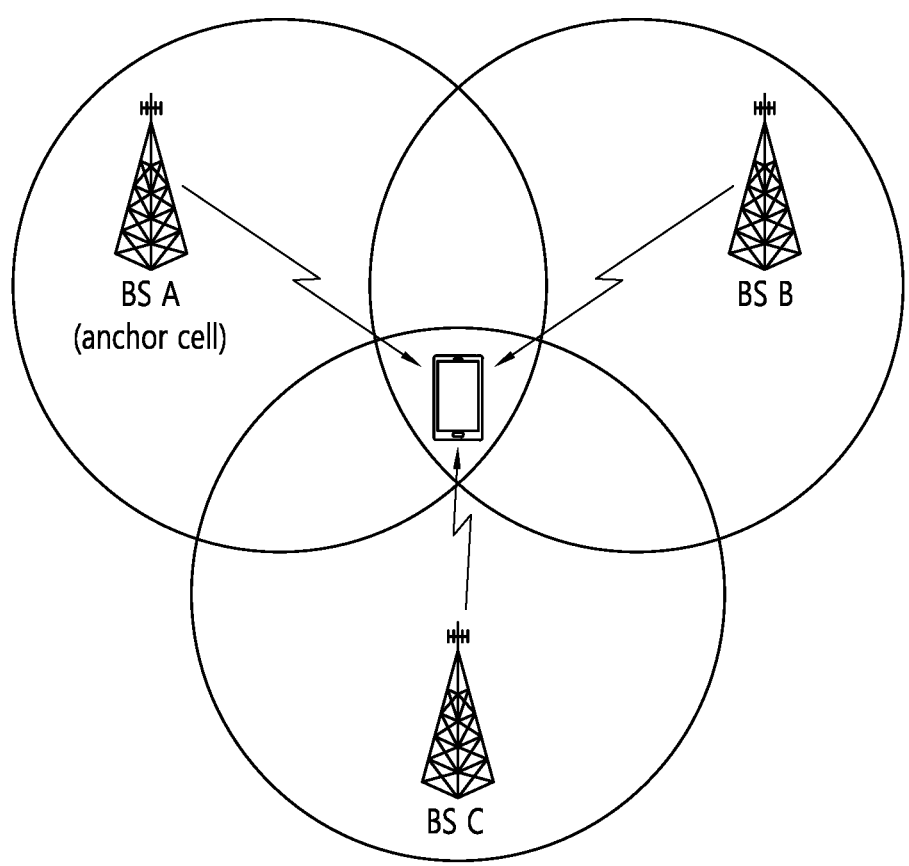
FIG. 15 is a drawing for explaining an OTDOA positioning method based on an embodiment of the present disclosure.

FIG. 15 is a drawing for explaining an OTDOA positioning method based on an embodiment of the present disclosure. The embodiment of FIG. 15 may be combined with various embodiments of the present disclosure.

The OTDOA positioning method uses measurement timing of downlink signals received by a UE from an eNB, an ng-eNB, and a plurality of TPs including a PRS-dedicated TP. The UE measures timing of downlink signals received by using location assistance data received from a location server. In addition, a location of the UE may be determined based on such a measurement result and geometric coordinates of neighboring TPs.

A UE connected to a gNB may request for a measurement gap for OTDOA measurement from the TP. If the UE cannot recognize a single frequency network (SFN) for at least one TP in the OTDOA assistance data, the UE may use an autonomous gap to obtain an SNF of an OTDOA reference cell before the measurement gap is requested to perform reference signal time difference (RSTD) measurement.

Herein, the RSTD may be defined based on a smallest relative time difference between boundaries of two subframes received respectively from a reference cell and a measurement cell. That is, the RSTD may be calculated based on a relative time difference between a start time of a subframe received from the measurement cell and a start time of a subframe of a reference cell closest to the start time of the subframe received from the measurement cell. Meanwhile, the reference cell may be selected by the UE.

For correct OTDOA measurement, it may be necessary to measure a time of arrival (TOA) of a signal received from three or more TPs or BSs geometrically distributed. For example, a TOA may be measured for each of a TP1, a TP2, and a TP3, and RSTD for TP 1-TP 2, RSTD for TP 2-TP 3, and RSTD for TP 3-TP 1 may be calculated for the three TOAs. Based on this, a geometric hyperbola may be determined, and a point at which these hyperbolas intersect may be estimated as a location of a UE. In this case, since accuracy and/or uncertainty for each TOA measurement may be present, the estimated location of the UE may be known as a specific range based on measurement uncertainty.

For example, RSTD for two TPs may be calculated based on Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 1]

Herein, c may be the speed of light, {xt, yt} may be a (unknown) coordinate of a target UE, {xi, yi} may be a coordinate of a (known) TP, and {x1, y1} may be a coordinate of a reference TP (or another TP). Herein, (Ti−T1) may be referred to as "real time differences (RTDs)" as a transmission time offset between two TPs, and ni, n1 may represent values related to UE TOA measurement errors.

(2) E-CID (Enhanced Cell ID)

In a cell ID (CID) positioning method, a location of a UE may be measured through geometric information of a serving ng-eNB, serving gNB, and/or serving cell of the UE. For example, the geometric information of the serving ng-eNB, serving gNB, and/or serving cell may be obtained through paging, registration, or the like.

Meanwhile, in addition to the CID positioning method, an E-CID positioning method may use additional UE measurement and/or NG-RAN radio resources or the like to improve a UE location estimation value. In the E-CID positioning method, although some of the measurement methods which are the same as those used in a measurement control system of an RRC protocol may be used, additional measurement is not performed in general only for location measurement of the UE. In other words, a measurement configuration or a measurement control message may not be provided additionally to measure the location of the UE. Also, the UE may not expect that an additional measurement operation only for location measurement will be requested, and may report a measurement value obtained through measurement methods in which the UE can perform measurement in a general manner.

For example, the serving gNB may use an E-UTRA measurement value provided from the UE to implement the E-CID positioning method.

Examples of a measurement element that can be used for E-CID positioning may be as follows.

UE measurement: E-UTRA reference signal received power (RSRP), E-UTRA reference signal received quality (RSRQ), UE E-UTRA Rx−Tx Time difference, GSM EDGE random access network (GERAN)/WLAN reference signal strength indication (RSSI), UTRAN common pilot channel (CPICH) received signal code power (RSCP), UTRAN CPICH Ec/Io E-UTRAN measurement: ng-eNB Rx−Tx Time difference, timing advance (TADV), angle of arrival (AoA)

Herein, the TADV may be classified into Type 1 and Type 2 as follows.

TADV Type 1=(ng-eNB Rx–Tx time difference)+
(UE E-UTRA Rx–Tx time difference)

TADV Type 2=ng-eNB Rx–Tx time difference

Meanwhile, AoA may be used to measure a direction of the UE. The AoA may be defined as an estimation angle with respect to the location of the UE counterclockwise from a BS/TP. In this case, a geographic reference direction may be north. The BS/TP may use an uplink signal such as a sounding reference signal (SRS) and/or a demodulation reference signal (DMRS) for AoA measurement. In addition, the larger the arrangement of the antenna array, the higher the measurement accuracy of the AoA. When the antenna arrays are arranged with the same interval, signals received from adjacent antenna elements may have a constant phase-rotate.

(3) UTDOA (Uplink Time Difference of Arrival)

UTDOA is a method of determining a location of a UE by estimating an arrival time of SRS. When calculating an estimated SRS arrival time, the location of the UE may be estimated through an arrival time difference with respect to another cell (or BS/TP) by using a serving cell as a reference cell. In order to implement the UTDOA, E-SMLC may indicate a serving cell of a target UE to indicate SRS transmission to the target UE. In addition, the E-SMLC may provide a configuration such as whether the SRS is periodical/aperiodical, a bandwidth, frequency/group/sequence hopping, or the like.

Meanwhile, in the present disclosure, for example, "configuration/being configured" or "definition/being defined" may refer to a (resource pool specific) (pre-)configuration from a base station or a network (through pre-defined signaling (e.g., SIB, MAC, RRC, etc.)). For example, "A is configured" may mean that "the base station or the network transmits information related to the A to a UE".

Meanwhile, for a positioning operation using a SL channel, a SL positioning reference signal (PRS) may be transmitted and received between UEs. In this case, if SL PRS resources used by a first positioning group including a plurality of UEs and a second positioning group including a plurality of UEs are overlapped, SL positioning may not be performed due to collision of the SL PRS resources. Further, if a SL PRS resource is configured without considering the characteristics of a positioning group (e.g., the number of UEs belonging to the positioning group, the distance between UEs belonging to the positioning group, etc.), SL positioning may not be performed normally. For example, if the distance between the UEs in the positioning group is large, and the symbol length of the SL PRS resource is configured to be short, the SL PRS may not be successfully received by the UEs, which may lead to failure of SL positioning. Furthermore, if the SL PRS resource is configured without considering the characteristics of the positioning group (e.g., the number of UEs in the positioning group, the distance between UEs in the positioning group, etc.), the SL PRS resource may be unnecessarily wasted. For example, if the distance between the UEs in the positioning group is short, the symbol length of the SL PRS resource is configured to be long, the SL PRS resource may be wasted unnecessarily. Therefore, there is a need to propose a method for performing SL positioning and an apparatus for supporting the same, in order to solve the above-mentioned problems.

Meanwhile, the positioning operation using the SL channel may be performed by agreement between a target UE (hereinafter referred to as a T-UE) that intends to obtain a location and a server UE (hereinafter referred to as an S-UE) that participates in the positioning operation of the T-UE. In the present disclosure, the positioning operation using the SL channel or the positioning operation based on the SL channel may be referred to as SL positioning. Furthermore, for UEs within a coverage of a base station/network, the base station/network that has the best knowledge of the UEs' communication and resource allocation information may transmit a configuration related to SL positioning to the UEs. That is, the base station/network may configure SL positioning to the UEs. In this way, the UEs participating in SL positioning can be determined and the collisions between PRSs transmitted by the UEs can be minimized. Based on various embodiments of the present disclosure, a method of SL positioning configured and performed by the base station/network and an apparatus supporting the same are proposed.

For example, based on a conventional Uu link-based positioning operation, operations of i) configuring positioning, ii) exchanging assistance data, and iii) actually calculating a location by receiving a measurement value for a transmitted PRS are all performed by a location server. For example, assistance data may be referred to as assistance information. For example, the assistance data required for SL positioning may include the following:

1) SL positioning type—positioning based on Time Difference of Arrival (TDOA), Round Trip Time (RTT), Angle of Arrival (AoA), Angle of Departure (AoD), Distributed Antenna System (DAS), etc.
2) SL-PRS configuration—PRS ID, comb-type/shift, PRS bandwidth (BW), periodicity, the number of repetitions (#repetition), etc.
3) SL-PRS resource—information related to time allocation (e.g., frame, slot, symbol), information related to frequency allocation (e.g., resource block, resource element)
4) Others—S-UE list, muting support, etc.

For example, the SL positioning technique configured by the network may be accomplished in two ways depending on the entity configuring SL positioning.

Figure 16:
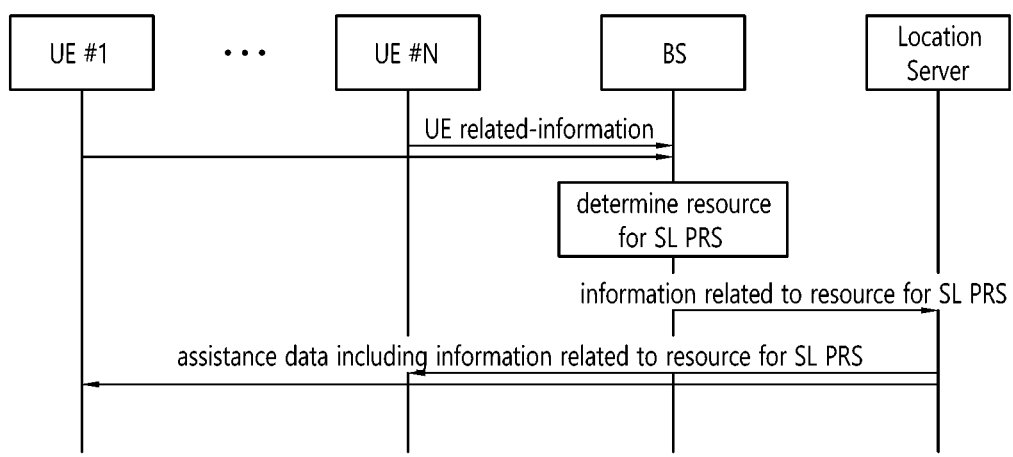
FIG. 16 shows a procedure for a UE to receive assistance data from a location server, based on an embodiment of the present disclosure.

FIG. 16 shows a procedure for a UE to receive assistance data from a location server, based on an embodiment of the present disclosure. The embodiment of FIG. 16 may be combined with various embodiments of the present disclosure.

Referring to FIG. 16, based on a first method, the assistance data may be exchanged between a location server or a base station performing some or all of functions of the location server and a target UE. In the first method, in the case that the assistance data is exchanged between the location server and the UE, for example, i) the base station may determine a resource related to a SL-PRS based on information on UEs, and ii) the base station may transmit information on the resource related to the SL-PRS to the location server, and iii) the location server may (finally) transmit assistance data including information on the resource related to the SL-PRS to the UEs. In the present disclosure, the resource related to the SL-PRS may be a resource related to transmission of the SL-PRS or a resource related to reception of the SL-PRS. Thus, based on the first method described above, the latency required to configure the assistance data to the UE may increase. Therefore, the first method described above may be unsuitable, for example, for a SL positioning service required in a V2X application, etc.

To compensate for these disadvantages, based on a second method, the base station may configure/transmit first assistance data to the UE. For example, the first assistance data may be assistance data that is advantageous for the base station to transmit/configure directly to the UE in terms of the latency, such as information on a resource related to a SL-PRS. On the other hand, the location server may configure/transmit second assistance data to the UE. For example, the second assistance data may be assistance data other than the first assistance data. In this way, the base station may directly configure/transmit the required assistance data to the UE, and as a result, the latency related to the SL positioning service of the UE may be reduced.

Figure 17:
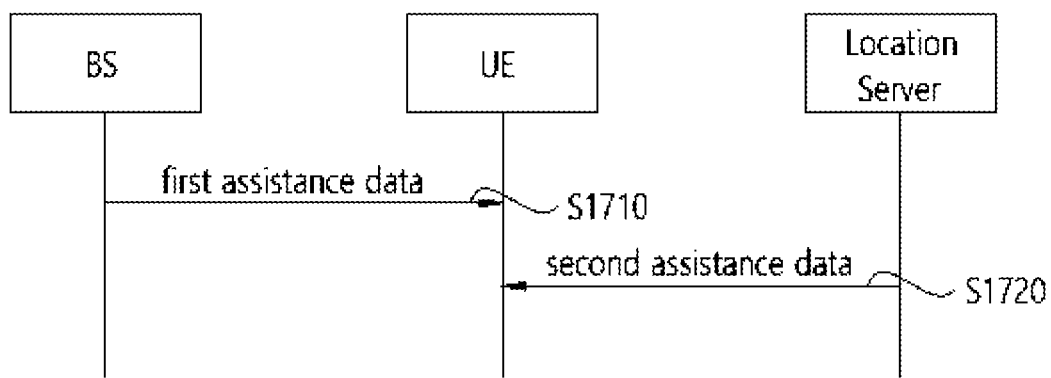
FIG. 17 shows a procedure for a UE to receive first assistance data and second assistance data, based on an embodiment of the present disclosure.

FIG. 17 shows a procedure for a UE to receive first assistance data and second assistance data, based on an embodiment of the present disclosure. The embodiment of FIG. 17 may be combined with various embodiments of the present disclosure.

Referring to FIG. 17, in step S1710, the base station may transmit first assistance data to the UE. For example, the first assistance data may include information on a resource related to a SL-PRS. In step S1720, the location server may configure/transmit second assistance data to the UE. For example, the second assistance data may include assistance data other than the first assistance data.

Although not shown in FIG. 17, the first assistance data may be determined by the base station based on UE-related information transmitted by a plurality of UEs. For example, the base station may receive UE-related information from the plurality of UEs, and the base station may determine the resource related to the SL-PRS based on the UE-related information, and the base station may transmit first assistance data including information on the resource related to the SL-PRS to the UEs.

If i) the base station configures the resource related to the SL-PRS to the UE, and/or ii) the UE is operating in the SL mode 1 in which the base station schedules the UE's transmission and transmission resources, the base station may configure the resource related to the SL-PRS to the UE that do not conflict with other SL communication resources of the UE.

If i) the base station configures a resource pool that can be used for SL communication (e.g., transmission-related resource pool) to the UE, and/or ii) the UE is operating in the SL mode 2 in which SL transmission is performed by selecting a SL transmission resource based on sensing for a SL transmission channel, the following operation may be possible.

For example, since the base station is not aware of the availability of the SL transmission resource, the UE performing the sensing for the SL transmission channel may report/transmit information related to the sensing to the base station. For example, the UE may report/transmit channel busy ratio (CBR), channel occupancy ratio (CR), signal-to-interference & noise ratio (SINR), etc. for the SL transmission channel to the base station.

For example, the T-UE or the S-UE may transmit information on UEs belonging to a SL positioning group to the base station. In this case, the base station may, based on the information on the UEs belonging to the SL positioning group, configure resources related to the SL-PRS to the UEs so that the resources related to the SL-PRS used by the UEs in the SL positioning group do not conflict with each other. For example, the information on the UEs belonging to the SL positioning group may include ID information of the SL positioning group, ID information of each of the UEs belonging to the SL positioning group, a maximum value of the distance between the UEs belonging to the SL positioning group, and a minimum value of the distance between the UEs belonging to the SL positioning group, an average value of the distance between the UEs in the SL positioning group, ID information of a zone to which each of the UEs belongs, the number of different SL positioning groups in which each of the UEs participates, and/or ID information of different SL positioning groups in which each of the UEs participates. For example, based on the information on the UEs belonging to the SL positioning group reported/transmitted by the UE to the base station, regardless of whether a particular UE is operating in the SL mode 1 or the SL mode 2, the base station may configure resources related to the SL-PRS for UEs so that SL-PRS transmission between UEs does not conflict with each other.

Figure 18:
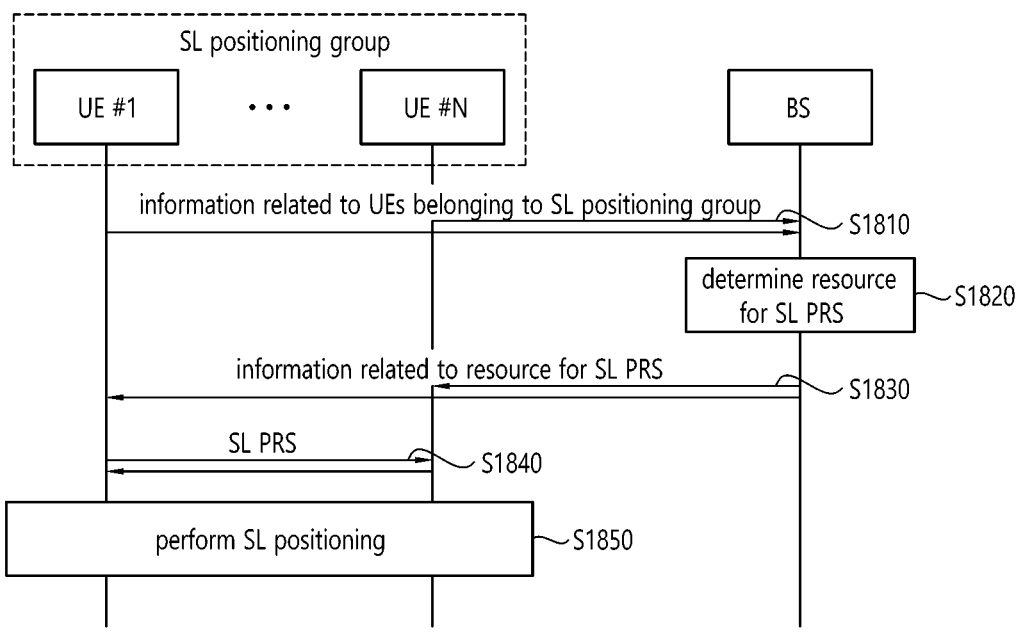
FIG. 18 shows a procedure for a UE to perform SL positioning based on a SL-PRS resource, based on an embodiment of the present disclosure.

FIG. 18 shows a procedure for a UE to perform SL positioning based on a SL-PRS resource, based on an embodiment of the present disclosure. The embodiment of FIG. 18 may be combined with various embodiments of the present disclosure.

Referring to FIG. 18, in step S1810, the UE may transmit information on UEs belonging to a SL positioning group to the base station. For example, the UE may be a T-UE. For example, the UE may be an S-UE. For example, the UE may be a UE representative of the group. For example, the UE may be all UEs belonging to the SL positioning group.

In step S1820, the base station may determine a resource for a SL-PRS based on the information on the UEs belonging to the SL positioning group. In step S1830, the base station may transmit the information on the resource for the SL-PRS to the UEs belonging to the SL positioning group.

For example, the base station may configure the number of symbols related to the SL-PRS and/or a bandwidth related to the SL-PRS to the UE. For example, the base station may transmit information on the number of symbols related to the SL-PRS and/or information on the bandwidth related to the SL-PRS to the UE. In the present disclosure, the number of symbols related to the SL-PRS may be the number of symbols for SL-PRS transmission or the number of symbols for SL-PRS reception. In the present disclosure, the bandwidth related to the SL-PRS may be a bandwidth for SL-PRS transmission or a bandwidth for SL-PRS reception.

For example, the number of symbols related to the SL-PRS may be configured based on the distance between UEs belonging to the SL positioning group. For example, if a maximum value of the distance between UEs belonging to the SL positioning group is relatively large or greater than a (pre-)configured threshold value, i) the number of symbols related to the SL-PRS may be configured to be relatively large, or ii) the number of symbols related to the SL-PRS may be configured to be a (pre-)configured first threshold value. For example, if a minimum value of the distance between UEs belonging to the SL positioning group is relatively large or greater than a (pre-)configured threshold value, i) the number of symbols related to the SL-PRS may be configured to be relatively large, or ii) the number of symbols related to the SL-PRS may be configured to be a (pre-)configured first threshold value. For example, if an average value of the distance between UEs belonging to the SL positioning group is relatively large or greater than a (pre-)configured threshold value, i) the number of symbols related to the SL-PRS may be configured to be relatively large, or ii) the number of symbols related to the SL-PRS may be configured to be a (pre-)configured first threshold value. In this way, a transmission coverage of the SL-PRS can be increased. For example, if a maximum value of the distance between UEs belonging to the SL positioning group is relatively small or less than a (pre-)configured threshold value, i) the number of symbols related to the SL-PRS may be configured to be relatively small, or ii) the number of symbols related to the SL-PRS may be configured to be a (pre-)configured second threshold value. For example, if a minimum value of the distance between UEs belonging to the SL positioning group is relatively small or less than a (pre-)configured threshold value, i) the number of symbols related to the SL-PRS may be configured to be relatively small, or ii) the number of symbols related to the SL-PRS may be configured to be a (pre-)configured second threshold value. For example, if an average value of the distance between UEs belonging to the SL positioning group is relatively small or less than a (pre-)configured threshold value, i) the number of symbols related to the SL-PRS may be configured to be relatively small, or ii) the number of symbols related to the SL-PRS may be configured to be a (pre-)configured second threshold value. In this way, a transmission coverage of the SL-PRS can be reduced. For example, the first threshold value may be greater than or equal to the second threshold value.

For example, the bandwidth related to the SL-PRS may be configured based on the distance between UEs belonging to the SL positioning group. For example, if a maximum value of the distance between UEs belonging to the SL positioning group is relatively large or greater than a (pre-)configured threshold value, i) the bandwidth related to the SL-PRS may be configured to be relatively small, or ii) the bandwidth related to the SL-PRS may be configured to be a (pre-)configured third threshold value. For example, if a minimum value of the distance between UEs belonging to the SL positioning group is relatively large or greater than a (pre-)configured threshold value, i) the bandwidth related to the SL-PRS may be configured to be relatively small, or ii) the bandwidth related to the SL-PRS may be configured to be a (pre-)configured third threshold value. For example, if an average value of the distance between UEs belonging to the SL positioning group is relatively large or greater than a (pre-)configured threshold value, i) the bandwidth related to the SL-PRS may be configured to be relatively small, or ii) the bandwidth related to the SL-PRS may be configured to be a (pre-)configured third threshold value. In this way, high power boosting can be performed. For example, if a maximum value of the distance between UEs belonging to the SL positioning group is relatively small or less than a (pre-)configured threshold value, i) the bandwidth related to the SL-PRS may be configured to be relatively large, or ii) the bandwidth related to the SL-PRS may be configured to be a (pre-)configured fourth threshold value. For example, if a minimum value of the distance between UEs belonging to the SL positioning group is relatively small or less than a (pre-)configured threshold value, i) the bandwidth related to the SL-PRS may be configured to be relatively large, or ii) the bandwidth related to the SL-PRS may be configured to be a (pre-)configured fourth threshold value. For example, if an average value of the distance between UEs belonging to the SL positioning group is relatively small or less than a (pre-)configured threshold value, i) the bandwidth related to the SL-PRS may be configured to be relatively large, or ii) the bandwidth related to the SL-PRS may be configured to be a (pre-)configured fourth threshold value. In this way, low power boosting can be performed. For example, the third threshold value may be less than or equal to the fourth threshold value.

For example, the distance between UEs belonging to the SL positioning group may be obtained by UEs belonging to the SL positioning group, and information related to the distance may be transmitted to the base station. For example, each of the UEs belonging to the SL positioning group may transmit, to the base station, an ID of a zone to which each of the UEs belongs, and the base station may obtain information related to the distance between the UEs belonging to the SL positioning group based on the zone ID.

For example, the base station may configure, to the UE, a time interval of symbols related to the SL-PRS and/or a spacing of a comb pattern of the SL-PRS in a frequency domain. For example, the base station may transmit, to the UE, information on the time interval of the symbols related to the SL-PRS and/or the spacing of the comb pattern of the SL-PRS in the frequency domain.

For example, the time interval of symbols related to the SL-PRS may be configured based on the number of UEs belonging to the SL positioning group. For example, if the number of UEs belonging to the SL positioning group is relatively large or greater than a (pre-)configured threshold value, i) the time interval of symbols related to the SL-PRS may be configured to be relatively large, or ii) the time interval of symbols related to the SL-PRS may be configured to be a (pre-)configured fifth threshold value. In this way, the number of multiplexing UEs can be increased. For example, if the number of UEs belonging to the SL positioning group is relatively small or less than a (pre-)configured threshold value, i) the time interval of symbols related to the SL-PRS may be configured to be relatively small, and/or ii) the time interval of symbols related to the SL-PRS may be configured to be a (pre-)configured sixth threshold value. In this way, the number of multiplexing UEs can be reduced. For example, the fifth threshold value may be greater than or equal to the sixth threshold value.

For example, the spacing of the comb pattern of the SL-PRS in the frequency domain may be configured based on the number of UEs belonging to the SL positioning group. For example, if the number of UEs belonging to the SL positioning group is relatively large or greater than a (pre-)configured threshold value, i) the spacing of the comb pattern of the SL-PRS in the frequency domain may be configured to be relatively large, or ii) the spacing of the comb pattern of the SL-PRS in the frequency domain may be configured to be a (pre-)configured seventh threshold value. In this way, the number of multiplexing UEs can be increased. For example, if the number of UEs belonging to the SL positioning group is relatively small or less than a (pre-)configured threshold value, i) the spacing of the comb pattern of the SL-PRS in the frequency domain may be configured to be relatively small, or ii) the spacing of the comb pattern of the SL-PRS in the frequency domain may be configured to be a (pre-)configured eighth threshold value. In this way, the number of multiplexing UEs can be reduced. In this way, the number of multiplexing UEs can be reduced. For example, the seventh threshold value may be greater than or equal to the eighth threshold value.

In step S1840, the UEs belonging to the SL positioning group may transmit or receive the SL PRS.

In step S1850, the UEs belonging to the SL positioning group may perform SL positioning based on the SL PRS. For example, the T-UE belonging to the SL positioning group may measure the location of the T-UE based on the SL PRS transmitted by the T-UE. For example, the T-UE belonging to the SL positioning group may measure the location of the T-UE based on the SL PRS transmitted by at least one S-UE belonging to the SL positioning group.

Figure 19:
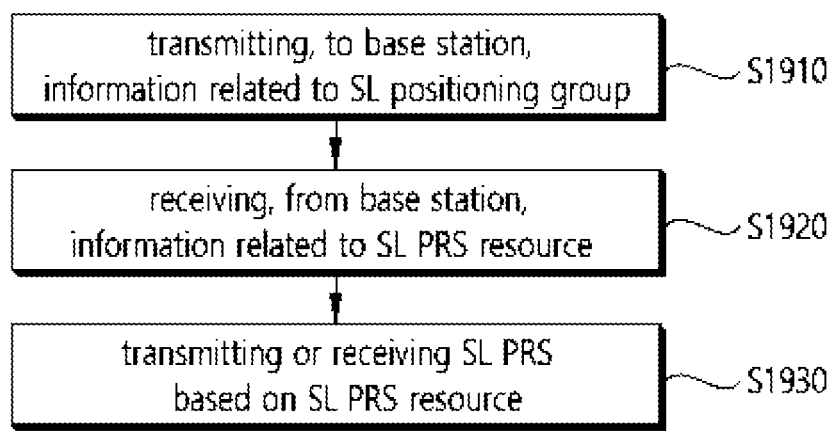
FIG. 19 shows a method for a first device to perform wireless communication, based on an embodiment of the present disclosure.

FIG. 19 shows a method for a first device to perform wireless communication, based on an embodiment of the present disclosure. The embodiment of FIG. 19 may be combined with various embodiments of the present disclosure.

Referring to FIG. 19, in step S1910, the first device may transmit, to a base station, information related to a sidelink (SL) positioning group. In step S1920, the first device may receive, from the base station, information related to a SL positioning reference signal (PRS) resource. In step S1930, the first device may transmit or receive a SL PRS based on the SL PRS resource. For example, the SL PRS may be a reference signal for positioning performed between a plurality of devices in the SL positioning group, and the SL PRS resource may be configured based on information related to the SL positioning group.

For example, the SL positioning group may be determined by the base station. For example, the SL positioning group may be determined by agreement between the first device and at least one device performing positioning with the first device.

For example, the information related to the SL positioning group may include information related to a distance between devices belonging to the SL positioning group, and a number of symbols included in the SL PRS resource or a bandwidth of the SL PRS resource may be determined based on the information related to the distance. For example, as the distance increases, the number of symbols included in the SL PRS resource may be configured to be large. For example, as the distance increases, the bandwidth of the SL PRS resource may be configured to be small. For example, the information related to the distance may include a zone ID of the first device or information related to a maximum distance between the devices.

For example, the information related to the SL positioning group may include information related to a number of devices belonging to the SL positioning group, and a time interval between symbols included in the SL PRS resource or a frequency interval of a comb pattern of the SL PRS resource may be determined based on the information related to the number of devices. For example, as the number of devices increases, the time interval between the symbols included in the SL PRS resource may be configured to be large. For example, as the number of devices increases, the frequency interval of the comb pattern of the SL PRS resource may be configured to be large.

For example, the information related to the SL positioning group may include at least one of ID information of the first device, information related to a number of SL positioning groups to which the first device belongs, or ID information of the SL positioning groups to which the first device belongs.

Additionally, for example, the first device may receive, from a location server, information related to a type of SL positioning. For example, the type of SL positioning may include at least one of Time Difference of Arrival (TDOA)-based positioning, Round Trip Time (RTT)-based positioning, Angle of Arrival (AoA)-based positioning, Angle of Departure (AoD)-based positioning, or Distributed Antenna System (DAS)-based positioning, and the information related to the SL PRS resource may include at least one of a SL PRS ID, a type of the SL PRS resource, a periodicity of the SL PRS, a repetition number of the SL PRS, information related to a time resource for the SL PRS, or information related to a frequency resource for the SL PRS.

The proposed method can be applied to the device(s) based on various embodiments of the present disclosure. First, the processor 102 of the first device 100 may control the transceiver 106 to transmit, to a base station, information related to a sidelink (SL) positioning group. In addition, the processor 102 of the first device 100 may control the transceiver 106 to receive, from the base station, information related to a SL positioning reference signal (PRS) resource. In addition, the processor 102 of the first device 100 may control the transceiver 106 to transmit or receive a SL PRS based on the SL PRS resource. For example, the SL PRS may be a reference signal for positioning performed between a plurality of devices in the SL positioning group, and the SL PRS resource may be configured based on information related to the SL positioning group.

Based on an embodiment of the present disclosure, a first device adapted to perform wireless communication may be provided. For example, the first device may comprise: one or more memories storing instructions: one or more transceivers; and one or more processors connected to the one or more memories and the one or more transceivers. For example, the one or more processors may execute the instructions to: transmit, to a base station, information related to a sidelink (SL) positioning group: receive, from the base station, information related to a SL positioning reference signal (PRS) resource; and transmit or receiving a SL PRS based on the SL PRS resource. For example, the SL PRS may be a reference signal for positioning performed between a plurality of devices in the SL positioning group, and the SL PRS resource may be configured based on information related to the SL positioning group.

Based on an embodiment of the present disclosure, an apparatus adapted to control a first user equipment (UE) performing wireless communication may be provided. For example, the apparatus may comprise: one or more processors: and one or more memories operably connected to the one or more processors and storing instructions. For example, the one or more processors may execute the instructions to: transmit, to a base station, information related to a sidelink (SL) positioning group: receive, from the base station, information related to a SL positioning reference signal (PRS) resource: and transmit or receiving a SL PRS based on the SL PRS resource. For example, the SL PRS may be a reference signal for positioning performed between a plurality of UEs in the SL positioning group, and the SL PRS resource may be configured based on information related to the SL positioning group.

Based on an embodiment of the present disclosure, a non-transitory computer-readable storage medium storing instructions may be provided. For example, the instructions, when executed, may cause a first device to: transmit, to a base station, information related to a sidelink (SL) positioning group: receive, from the base station, information related to a SL positioning reference signal (PRS) resource; and transmit or receiving a SL PRS based on the SL PRS resource. For example, the SL PRS may be a reference signal for positioning performed between a plurality of devices in the SL positioning group, and the SL PRS resource may be configured based on information related to the SL positioning group.

Figure 20:
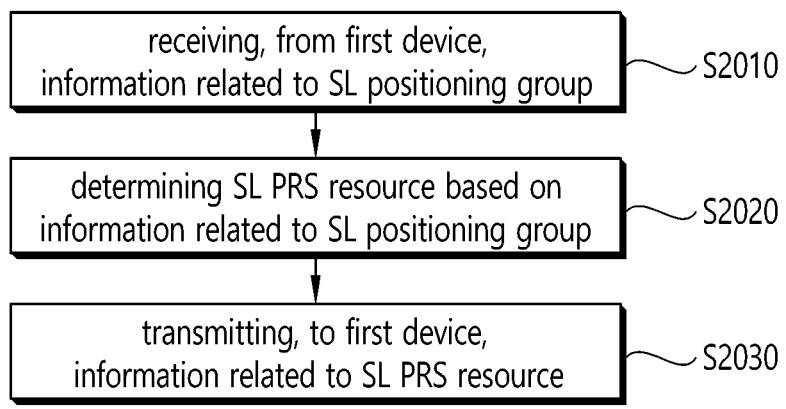
FIG. 20 shows a method for a base station to perform wireless communication, based on an embodiment of the present disclosure.

FIG. 20 shows a method for a base station to perform wireless communication, based on an embodiment of the present disclosure. The embodiment of FIG. 20 may be combined with various embodiments of the present disclosure.

Referring to FIG. 20, in step S2010, the base station may receive, from a first device, information related to a sidelink (SL) positioning group. In step S2020, the base station may determine a SL positioning reference signal (PRS) resource based on the information related to the SL positioning group. In step S2030, the base station may transmit, to the first device, information related to the SL PRS resource. For example, the SL PRS resource may be a resource for transmitting and receiving a reference signal for positioning between a plurality of devices in the SL positioning group.

The proposed method can be applied to the device(s) based on various embodiments of the present disclosure. First, the processor 202 of the base station 200 may control the transceiver 206 to receive, from a first device, information related to a sidelink (SL) positioning group. In addition, the processor 202 of the base station 200 may determine a SL positioning reference signal (PRS) resource based on the information related to the SL positioning group. In addition, the processor 202 of the base station 200 may control the transceiver 206 to transmit, to the first device, information related to the SL PRS resource. For example, the SL PRS resource may be a resource for transmitting and receiving a reference signal for positioning between a plurality of devices in the SL positioning group.

Based on an embodiment of the present disclosure, a base station adapted to perform wireless communication may be provided. For example, the base station may comprise: one or more memories storing instructions: one or more transceivers: and one or more processors connected to the one or more memories and the one or more transceivers. For example, the one or more processors may execute the instructions to: receive, from a first device, information related to a sidelink (SL) positioning group: determine a SL positioning reference signal (PRS) resource based on the information related to the SL positioning group; and transmit, to the first device, information related to the SL PRS resource. For example, the SL PRS resource may be a resource for transmitting and receiving a reference signal for positioning between a plurality of devices in the SL positioning group.

Based on an embodiment of the present disclosure, an apparatus adapted to control a base station may be provided. For example, the apparatus may comprise: one or more processors: and one or more memories operably connected to the one or more processors and storing instructions. For example, the one or more processors may execute the instructions to: receive, from a first UE, information related to a sidelink (SL) positioning group: determine a SL positioning reference signal (PRS) resource based on the information related to the SL positioning group: and transmit, to the first UE, information related to the SL PRS resource. For example, the SL PRS resource may be a resource for transmitting and receiving a reference signal for positioning between a plurality of UEs in the SL positioning group.

Based on an embodiment of the present disclosure, a non-transitory computer-readable storage medium storing instructions may be provided. For example, the instructions, when executed, may cause a base station to: receive, from a first device, information related to a sidelink (SL) positioning group: determine a SL positioning reference signal (PRS) resource based on the information related to the SL positioning group; and transmit, to the first device, information related to the SL PRS resource. For example, the SL PRS resource may be a resource for transmitting and receiving a reference signal for positioning between a plurality of devices in the SL positioning group.

In the present disclosure, a method for configuring assistance data required to perform SL positioning when SL positioning is configured by the network, such as the location server, the base station, etc., and apparatus supporting the same are proposed. Furthermore, in the present disclosure, a method for minimizing the conflict of the SL-PRS transmission between UEs belonging to the SL positioning group when the base station configures the resource related to the SL-PRS to the UEs according to the above method, and apparatus supporting the same are proposed.

Based on various embodiments of the present disclosure, the base station can configure the resource for the SL PRS based on information received from UEs. Thus, the SL PRS resource used by the first positioning group including a plurality of UEs and the second positioning group including a plurality of UEs can be configured to be non-overlapping. Furthermore, since the SL PRS resource is configured in consideration of the characteristics of the positioning group (e.g., the number of UEs belonging to the positioning group, the distance between the UEs belonging to the positioning group, etc.), the SL PRS resource can be configured within a range in which the SL PRS can be performed efficiently. In this way, the problem of unnecessarily high SL PRS resources being allocated and/or the problem of SL positioning not being performed due to low SL PRS resources being allocated can be solved.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
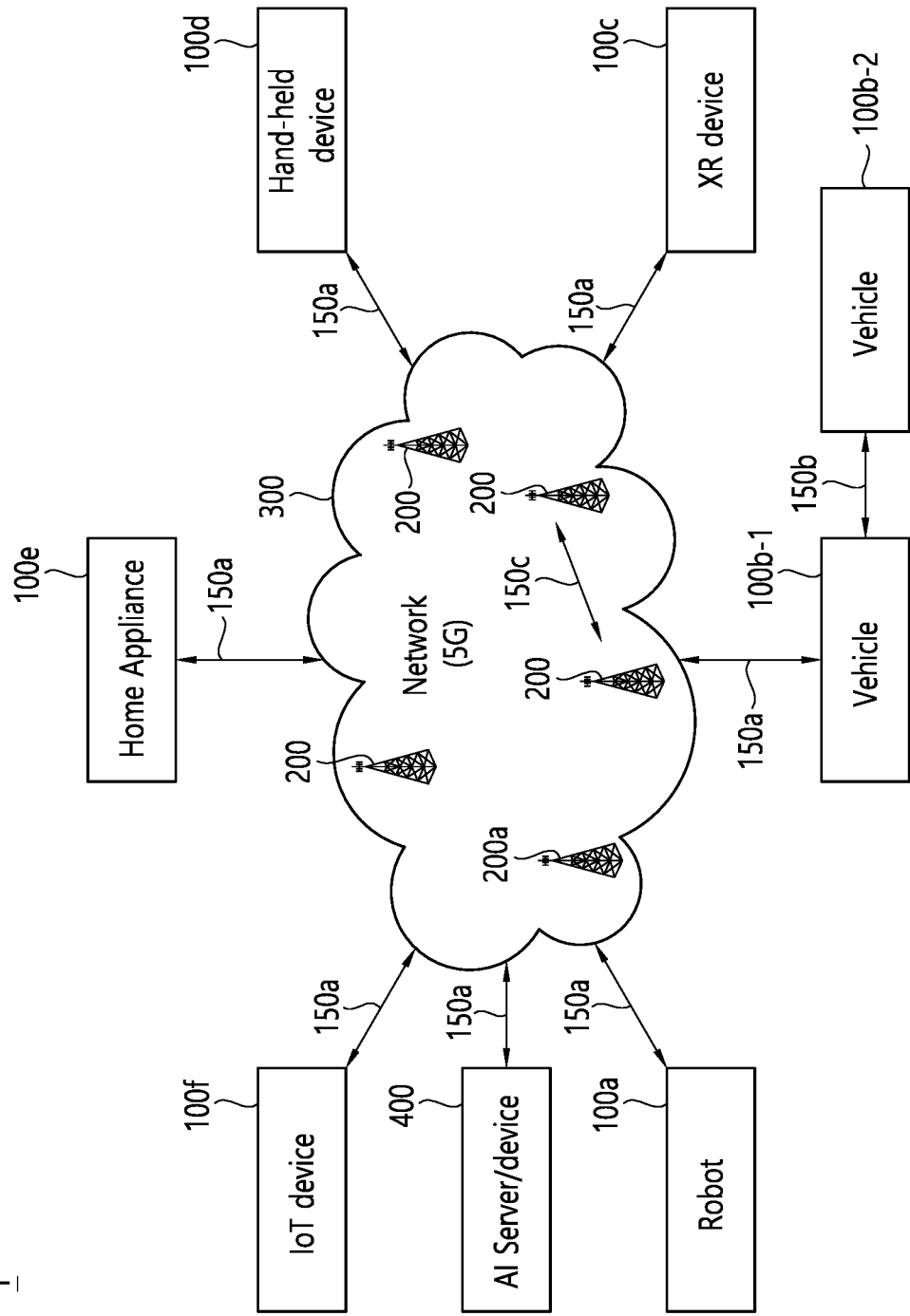
FIG. 21 shows a communication system 1, based on an embodiment of the present disclosure.

FIG. 21 shows a communication system 1, based on an embodiment of the present disclosure.

Referring to FIG. 21, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IOT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IOT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
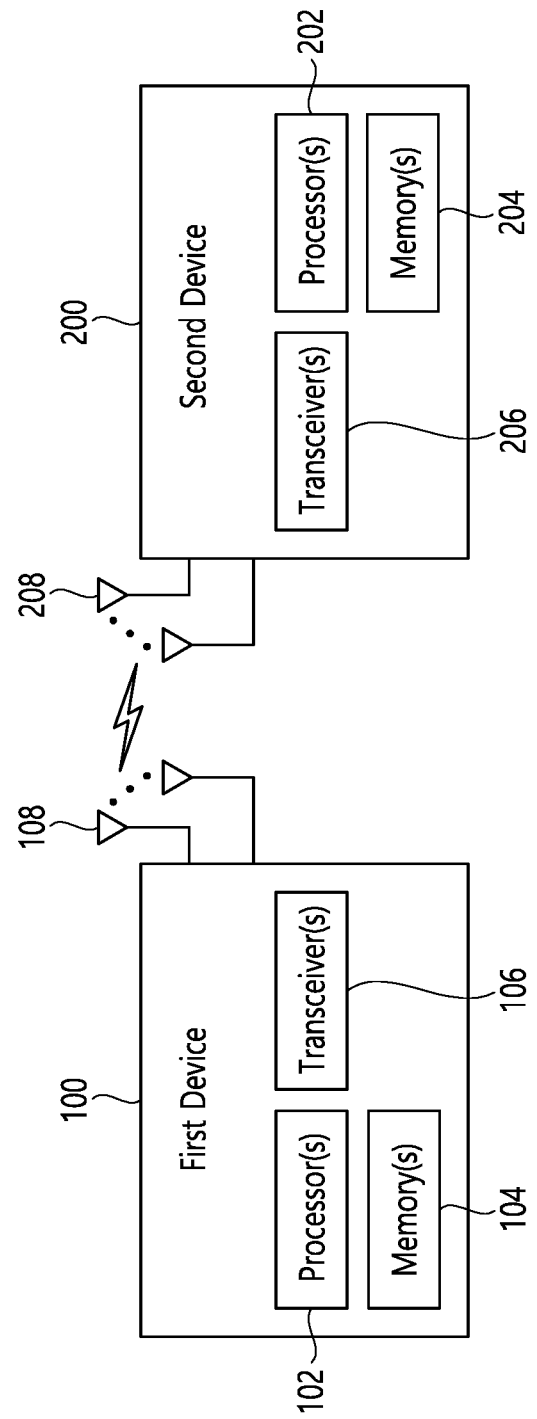
FIG. 22 shows wireless devices, based on an embodiment of the present disclosure.

FIG. 22 shows wireless devices, based on an embodiment of the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
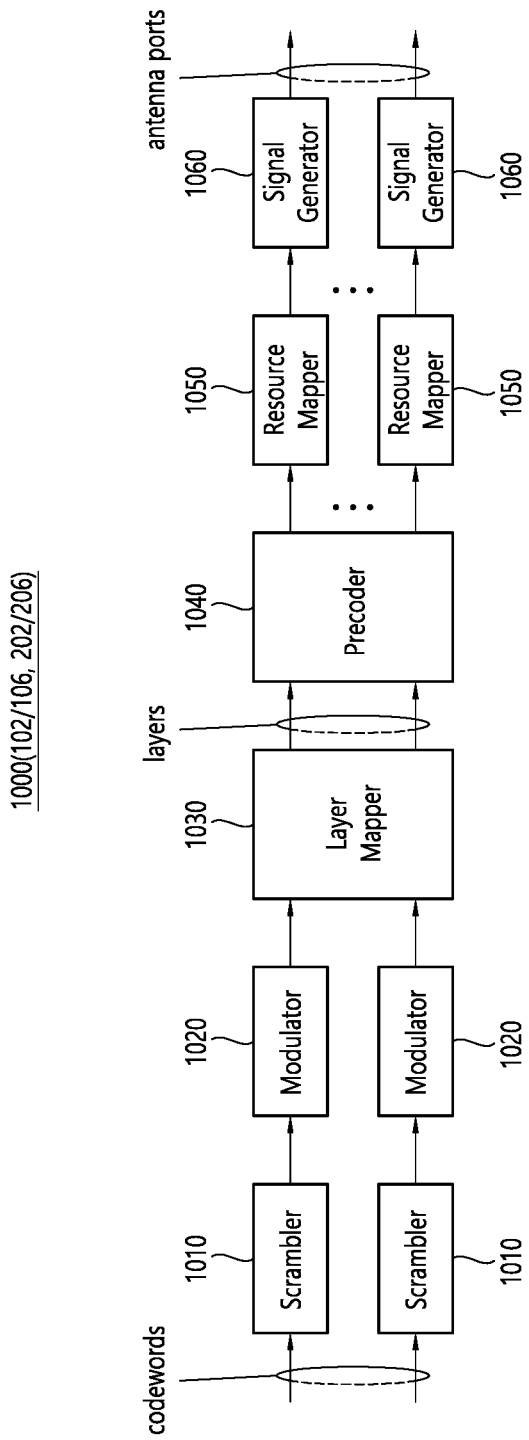
FIG. 23 shows a signal process circuit for a transmission signal, based on an embodiment of the present disclosure.

FIG. 23 shows a signal process circuit for a transmission signal, based on an embodiment of the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
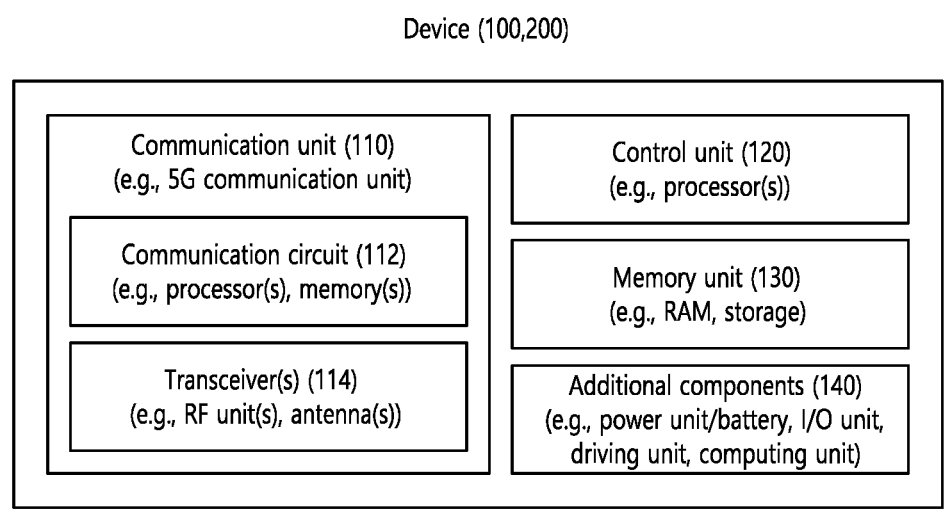
FIG. 24 shows another example of a wireless device, based on an embodiment of the present disclosure.

FIG. 24 shows another example of a wireless device, based on an embodiment of the present disclosure. The wireless device may be implemented in various forms according to a use-case/service (refer to FIG. 21).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
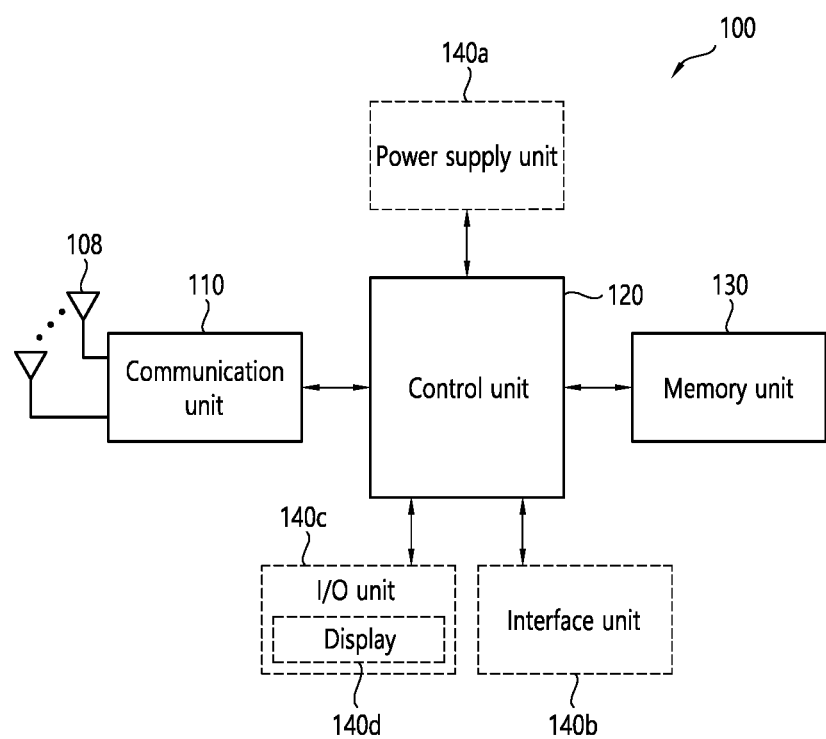
FIG. 25 shows a hand-held device, based on an embodiment of the present disclosure.

FIG. 25 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 26:
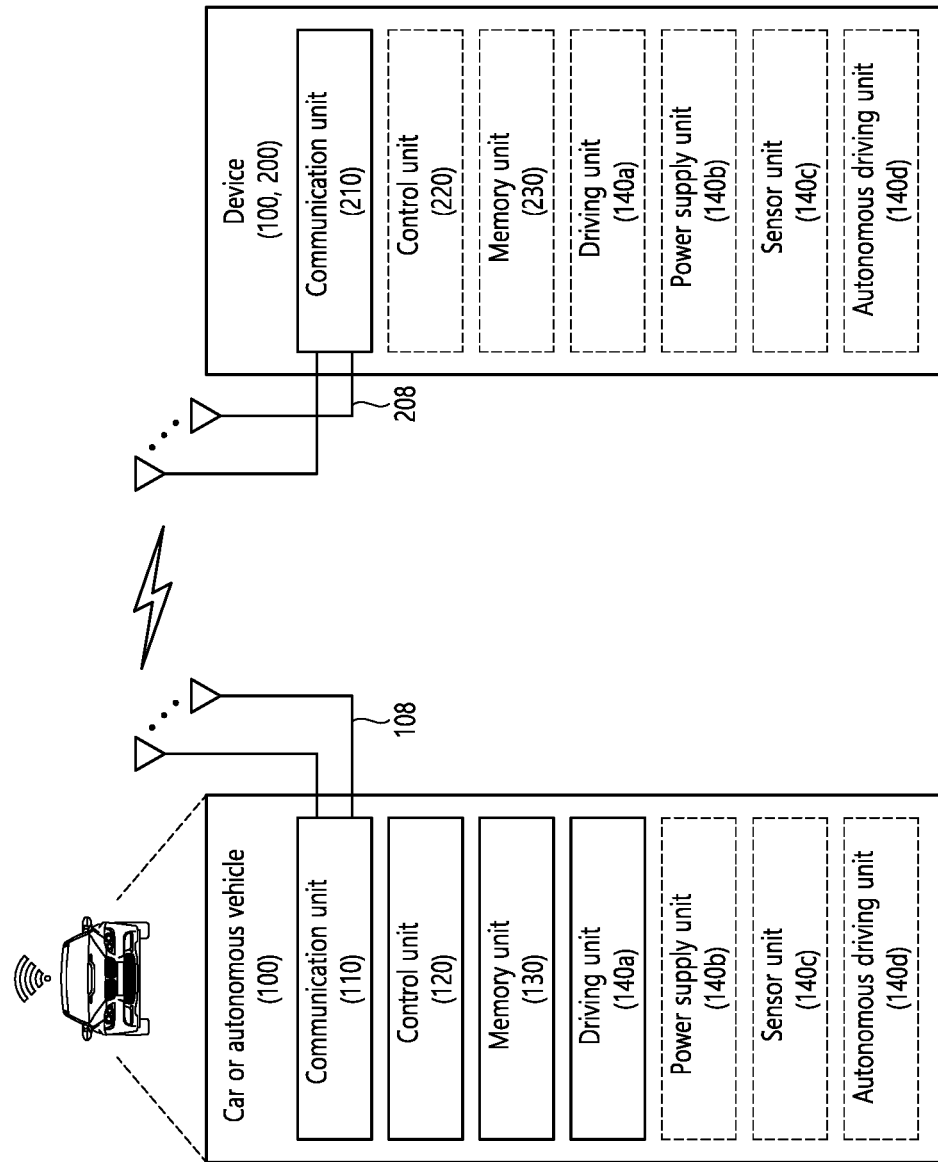
FIG. 26 shows a vehicle or an autonomous vehicle, based on an embodiment of the present disclosure.

FIG. 26 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 26, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:
1. A method comprising:
 transmitting, by a first device to a base station, information related to a positioning group including information related to a distance between devices belonging to the positioning group;

receiving, by the first device from the base station, information related to a positioning reference signal (PRS) resource; and transmitting or receiving, by the first device, a PRS based on the information related to the PRS resource, wherein the PRS is a reference signal for positioning performed between a plurality of devices in the positioning group, and wherein a number of symbols or a bandwidth of the PRS resource, allocated by the information related to the PRS resource, is configured based on the information related to the distance between the devices belonging to the positioning group.

2. The method of claim 1, wherein the positioning group is determined by the base station.

3. The method of claim 1, wherein the positioning group is determined by agreement between the first device and at least one device performing positioning with the first device.

4. The method of claim 1, wherein, as the distance increases, the number of symbols of the PRS resource is configured to be large.

5. The method of claim 1, wherein, as the distance increases, the bandwidth of the PRS resource is configured to be small.

6. The method of claim 1, wherein the information related to the distance includes a zone identity (ID) of the first device or information related to a maximum distance between the devices.

7. The method of claim 1, wherein the information related to the positioning group further includes at least one of:
ID information of the first device,
information related to a number of positioning groups to which the first device belongs, or
ID information of the positioning groups to which the first device belongs.

8. The method of claim 1, further comprising:
receiving, from a location server, information related to a type of positioning.

9. The method of claim 8,
wherein the type of positioning includes at least one of:
Time Difference of Arrival (TDOA)-based positioning,
Round Trip Time (RTT)-based positioning,
Angle of Arrival (AoA)-based positioning,
Angle of Departure (AoD)-based positioning, or
Distributed Antenna System (DAS)-based positioning, and
wherein the information related to the PRS resource includes at least one of:
a PRS ID,
a type of the PRS resource,
a periodicity of the PRS,
a repetition number of the PRS,
information related to a time resource for the PRS, or
information related to a frequency resource for the PRS.

10. A first device comprising:
at least one transceiver;
at least one processor; and
at least one memory connected to the at least one processor and storing instructions that, based on being executed, cause the first device to perform operations comprising:
transmitting, to a base station, information related to a positioning group including information related to a distance between devices belonging to the positioning group;
receiving, from the base station, information related to a positioning reference signal (PRS) resource; and
transmitting or receiving a PRS based on the PRS resource,
wherein the PRS is a reference signal for positioning performed between a plurality of devices in the positioning group, and
wherein a number of symbols or a bandwidth of the PRS resource, allocated by the information related to the PRS resource, is configured based on the information related to the distance between the devices belonging to the positioning group.

11. The first device of claim 10, wherein the positioning group is determined by the base station.

12. The first device of claim 10, wherein the positioning group is determined by agreement between the first device and at least one device performing positioning with the first device.

13. The first device of claim 10, wherein, as the distance increases, the number of symbols of the PRS resource is configured to be large.

14. The first device of claim 10, wherein, as the distance increases, the bandwidth of the PRS resource is configured to be small.

15. A processing device comprising:
at least one processor; and
at least one memory connected to the at least one processor and storing instructions that, based on being executed, cause a first device to perform operations comprising:
transmitting, to a base station, information related to a positioning group including information related to a distance between devices belonging to the positioning group;
receiving, from the base station, information related to a positioning reference signal (PRS) resource; and
transmitting or receiving a PRS based on the PRS resource,
wherein the PRS is a reference signal for positioning performed between a plurality of devices in the positioning group, and
wherein a number of symbols or a bandwidth of the PRS resource, allocated by the information related to the PRS resource, is configured based on the information related to the distance between the devices belonging to the positioning group.

16. The processing device of claim 15, wherein the positioning group is determined by the base station.

17. The processing device of claim 15, wherein the positioning group is determined by agreement between the first device and at least one device performing positioning with the first device.

18. The processing device of claim 15, wherein, as the distance increases, the number of symbols of the PRS resource is configured to be large.

19. The processing device of claim 15, wherein, as the distance increases, the bandwidth of the PRS resource is configured to be small.

* * * * *